(12) United States Patent
Fukuda

(10) Patent No.: US 11,409,631 B2
(45) Date of Patent: Aug. 9, 2022

(54) VERIFICATION AUTOMATION APPARATUS, VERIFICATION AUTOMATION METHOD, AND COMPUTER-READABLE RECORDING MEDIUM

(71) Applicant: NEC Corporation, Tokyo (JP)

(72) Inventor: Tatsuya Fukuda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/257,676

(22) PCT Filed: Jun. 27, 2019

(86) PCT No.: PCT/JP2019/025590
§ 371 (c)(1),
(2) Date: Jan. 4, 2021

(87) PCT Pub. No.: WO2020/008991
PCT Pub. Date: Jan. 9, 2020

(65) Prior Publication Data
US 2021/0208996 A1 Jul. 8, 2021

(30) Foreign Application Priority Data
Jul. 4, 2018 (JP) .............................. JP2018-127878

(51) Int. Cl.
G06F 11/36 (2006.01)
G06F 8/71 (2018.01)
G06F 8/76 (2018.01)

(52) U.S. Cl.
CPC ............ *G06F 11/3608* (2013.01); *G06F 8/71* (2013.01); *G06F 8/76* (2013.01)

(58) Field of Classification Search
CPC .... G06F 11/3692; G06F 11/3608; G06F 8/71; G06F 11/3684; G06F 11/3688; G06F 8/76
(Continued)

(56) References Cited

U.S. PATENT DOCUMENTS 5,758,156 A 5/1998 Kano
2010/0005529 A1* 1/2010 Hemade .............. H04L 41/0869
726/22
(Continued)

FOREIGN PATENT DOCUMENTS

JP S63-138425 A 6/1988
JP H07-093185 A 4/1995
JP H08-030487 A 2/1996

OTHER PUBLICATIONS

International Search Report for PCT Application No. PCT/JP2019/025590, dated Sep. 10, 2019.
(Continued)

Primary Examiner — John Q Chavis
(74) Attorney, Agent, or Firm — Sughrue Mion, PLLC

(57) ABSTRACT

The invention makes it possible to reuse a verification script without manually modifying the internal parameters of the verification script. A verification automation apparatus 1 adapts a verification script to a system that is to be verified. The verification automation apparatus 1 includes: a verification script acquisition unit 101 that acquires a verification script that includes an execution script for verification work and execution enabling requirements for executing the execution script; a verification configuration search unit 104 that searches the system to be verified, for configurations for which the execution script is executable, using environment information regarding the system to be verified, and the execution enabling requirements; and an execution script materializing unit 105 that materializes the execution script based on the configuration that has been found through the search, so as to be executable in the system to be verified.

9 Claims, 25 Drawing Sheets

(58) Field of Classification Search
USPC .......................................................... 717/126
See application file for complete search history.

(56) References Cited

U.S. PATENT DOCUMENTS

2013/0232474 A1* 9/2013 Leclair ................ G06F 11/3668
717/134
2017/0052871 A1* 2/2017 Gyure ....................... G06F 8/70

OTHER PUBLICATIONS

Network Test System Project Team, "2016 Network Test System Project Report", Apr. 10, 2017, JAPAN, [online], [Retrieved on Mar. 28, 2018], the Internet <URL:https://github.com/net-tester/2016-nwtestsyspj-report>.

English translation of Written opinion for PCT Application No. JP2019/025590, dated Sep. 10, 2019.

* cited by examiner

Fig.9

|  | VENDOR C | VENDOR J | OS_W | OS_L |
|---|---|---|---|---|
| ACCESS WEB CONSOLE OF $C$ | ... | ... | bitsadmin.exe/TRANSFER html $C$ C:¥temp¥index.html | wget $C$ |
| ACQUIRE INTERFACE ADDRESS OF $R$ | show ipv4 interface breif | show interfaces terse | ... | ... |

Fig.17

```
VERIFICATION SCRIPT

●VERIFICATION INTENTION
  ●FUNCTIONALITY > ACCESS CHECK > WEB CONSOLE

●VERIFICATION PURPOSE
  ●A DEVELOPER
    WISHES TO ACCESS THE WEB CONSOLE OF THE IN-HOUSE TEST
ENVIRONMENT SERVER TO CARRY OUT TESTS AND CHECKS IN THE
TEST ENVIRONMENT
```

VERIFICATION AUTOMATION APPARATUS, VERIFICATION AUTOMATION METHOD, AND COMPUTER-READABLE RECORDING MEDIUM

This application is a National Stage Entry of PCT/JP2019/025590 filed on Jun. 27, 2019, which claims priority from Japanese Patent Application 2018-127878 filed on Jul. 4, 2018, the contents of all of which are incorporated herein by reference, in their entirety.

TECHNICAL FIELD

The present invention relates to a verification automation apparatus and a verification automation method for automating verification in a specific system, and further relates to a computer-readable recording medium on which a program for realizing them is recorded.

BACKGROUND ART

When building an information system and providing it to users, the system builder combines various products and technologies to build the system, and needs to verify that the built system operates properly.

Due to the development of virtualization technology in recent years, it is possible to flexibly build and control a system. However, the scale and complexity of such a system have been increasing. Due to such an increase in the scale and complexity of a system, it is no longer realistic to perform comprehensive manual verification in a conventional manner, and there is a need for a technology for automating verification work.

Therefore, for example, Non-Patent Document 1 discloses an example of a verification automation apparatus for automating verification work. The verification automation apparatus disclosed in Non-Patent Document 1 employs the concept of BDD (Behavior Driven Development), in which whether or not the system to be verified behaves as expected in a given environment is verified. The verification automation apparatus disclosed in Non-Patent Document 1 creates a verification script for automatically verify the system.

Also, the verification automation apparatus disclosed in Non-Patent Document 1 separately describes a test case in which behaviors that are expected from the specifications, and specific implementations of the system, in a verification script. Furthermore, the verification automation apparatus disclosed in Non-Patent Document 1 associates each of the statements described in the test case with a specific implementation. As a result, the system builder can easily understand the test case, and can reuse the statements for operating the constituent elements of the system.

LIST OF PRIOR ART DOCUMENTS

Non-Patent Document

Non-Patent Document 1: "2016 Network Test System Project Report", [online], Apr. 10, 2017, Network Test System Project Team, [Retrieved on Mar. 28, 2018], the Internet <URL: https://github.com/net-tester/2016-nwtestsyspj-report>

DISCLOSURE OF THE INVENTION

Problems to be Solved by the Invention

The verification automation apparatus disclosed in Non-Patent Document 1 described above is problematic in that, even if the content to be verified is the same as before, if the devices that can be used in a new system and the configurations thereof are different from those in the systems verified in the past, the verification scripts created in the past cannot be used in verification of the new system. This is because the internal parameters of a verification script are dependent on the environment of the system to be verified, and in order to use the verification script for another system, it is necessary to manually modify the internal parameters.

OBJECT OF THE INVENTION

An example object of the present invention is to provide a verification automation apparatus, a verification automation method, and a computer-readable recording medium that can solve the above-described problems and make it possible to reuse a verification script without manually modifying the internal parameters of the verification script.

Means for Solving the Problems

To achieve the above-described object, a verification automation apparatus according to one aspect of the present invention is an apparatus for adapting a verification script to a system that is to be verified, including:

a verification script acquisition means for acquiring the verification script including an execution script for verification work and execution enabling requirements for executing the execution script;

a verification configuration search means for, using environment information regarding the system to be verified and the execution enabling requirements, searching for configurations which enable to execute the execution script in the system to be verified; and an execution script materializing means for materializing the execution script based on the configuration that has been found through the search, so as to be executable on the system to be verified.

To achieve the above-described object, a verification automation method according to one aspect of the present invention is a method for adapting a verification script to a system that is to be verified, including:

acquiring the verification script including an execution script for verification work and execution enabling requirements for executing the execution script;

using environment information regarding the system to be verified and the execution enabling requirements, searching for configurations which enable to execute the execution script in the system to be verified; and materializing the execution script based on the configuration that has been found through the search, so as to be executable in the system to be verified.

Furthermore, a computer-readable recording medium according to one aspect of the present invention is a computer-readable recording medium that includes a program recorded thereon, the program being for adapting a verification script to a system that is to be verified and including instructions for causing a computer to carry out:

(a) a step of acquiring the verification script including an execution script for verification work and execution enabling requirements for executing the execution script;

(b) a step of, using environment information regarding the system to be verified and the execution enabling requirements, searching for configurations which enable to execute the execution script in the system to be verified; and (c) a step of materializing the execution script based on the configuration that has been found through the search, so as to be executable in the system to be verified.

Advantageous Effects of the Invention

As described above, the present invention makes it possible to reuse a verification script without manually modifying the internal parameters of the verification script.

BRIEF DESCRIPTION OF THE DRAWINGS

FIG. 9 is a diagram showing an example of device information that is used in the second example embodiment of the present invention.

FIG. 17 is a diagram showing an example of a verification script used in the fifth example embodiment of the present invention.

EXAMPLE EMBODIMENTS

First Example Embodiment

The following describes a verification automation apparatus, a verification automation method, and a program according to a first example embodiment of the present invention with reference to FIGS. 1 to 6.

[Apparatus Configuration]

Figure 1:
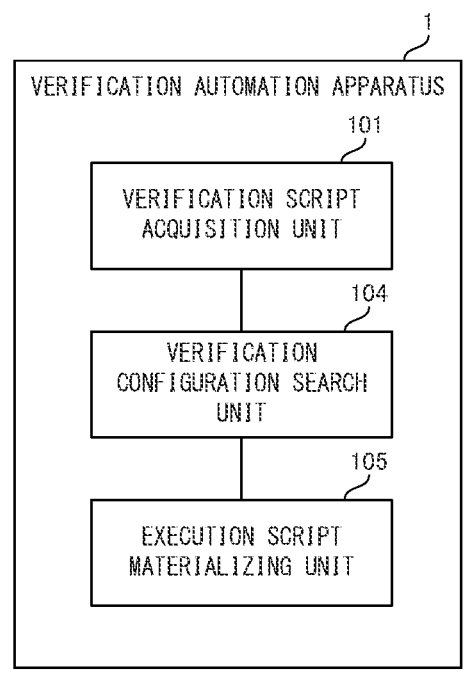
FIG. 1 is a block diagram showing an overall configuration of a verification automation apparatus according to a first example embodiment of the present invention.

First, an overall configuration of a verification automation apparatus according to a first example embodiment of the present invention will be described with reference to FIG. 1. FIG. 1 is a block diagram showing an overall configuration of a verification automation apparatus according to the first example embodiment of the present invention.

A verification automation apparatus 1 according to the present embodiment shown in FIG. 1 is an apparatus for adapting a verification script to a system that is to be verified. As shown in FIG. 1, the verification automation apparatus 1 includes a verification script acquisition unit 101, a verification configuration search unit 104, and an execution script materializing unit 105.

The verification script acquisition unit 101 functions as a verification script acquisition means, and acquires a verification script that is to be used in verification of a system. The verification script includes an execution script that performs verification work and execution enabling requirements for executing the execution script.

The verification configuration search unit 104 functions as a verification configuration search means, and searches a system that is to be verified, for a configuration for which the execution script is executable, using environment information regarding the system to be verified, and execution enabling requirements included in the verification script.

The execution script materializing unit 105 functions as an execution script materializing means, and materializes the execution script based on the configuration found by the verification configuration search unit 104, so as to be executable in the system to be verified.

As described above, in the present example embodiment, the verification automation apparatus 1 can adapt the verification script to a system that is to be verified, without relying on manual operation. That is to say, the present example embodiment makes it possible to reuse a verification script without manually modifying the internal parameters of the verification script.

Figure 2:
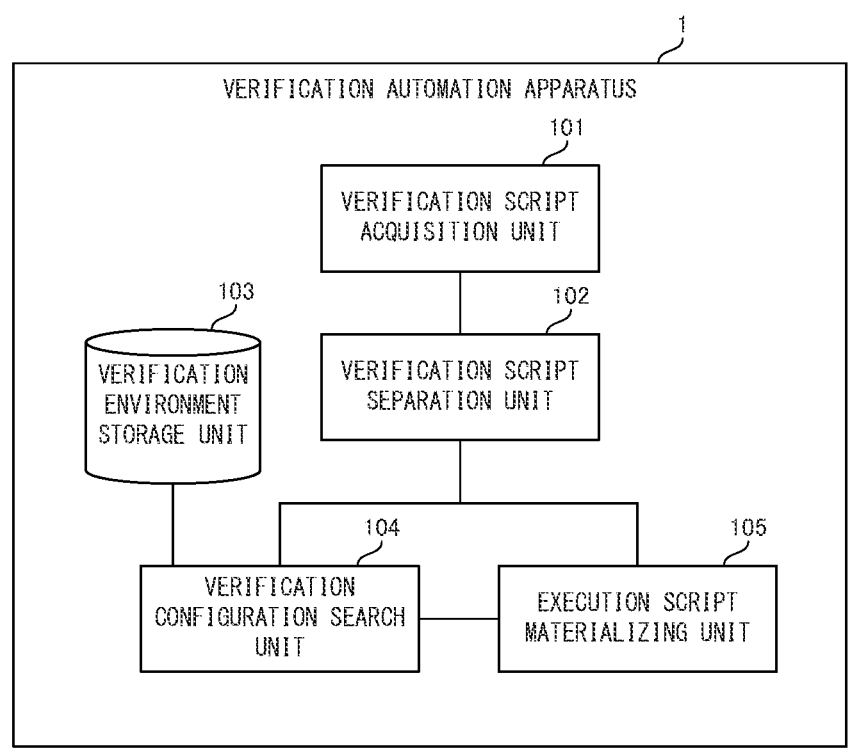
FIG. 2 is a block diagram showing a specific configuration of the verification automation apparatus according to the first example embodiment of the present invention.

Next, the configuration and the functions of the verification automation apparatus according to the example embodiment 1 will be specifically described with reference to FIGS. 2 to 5. FIG. 2 is a block diagram showing a specific configuration of the verification automation apparatus according to the first example embodiment of the present invention.

As shown in FIG. 2, the verification automation apparatus 1 according to the first example embodiment also includes a verification script separation unit 102 and a verification environment storage unit 103 in addition to the verification script acquisition unit 101, the verification configuration search unit 104, and the execution script materializing unit 105 described above.

Also, in the first example embodiment, the verification script acquisition unit 101 is connected to the verification script separation unit 102. The verification script acquisition unit 101 acquires a verification script as described above. In this case, the verification script acquisition unit 101 acquires a verification script from a storage device that is included in the verification automation apparatus 1, another terminal device that is connected thereto via a network, or the like. A verification script includes an execution script and execution enabling requirements as described above.

Execution enabling requirements that are envisioned in the execution script include information regarding a system configuration for which the execution script is executable. Specifically, execution enabling requirements specify configurations that are required for the execution script to operate, such as various network devices, a connection configuration between them, and so on. Various network devices are represented as symbols or parameters. Specifically, a network device such as a router is represented as "R", and a device without a special function is denoted as "C".

An execution script is provided with specific device types and parameters that are dependent on the environment of the system to be verified (hereinafter referred to as a "verification environment"), for example. These parameters may be null, and may be editable.

Figure 3:
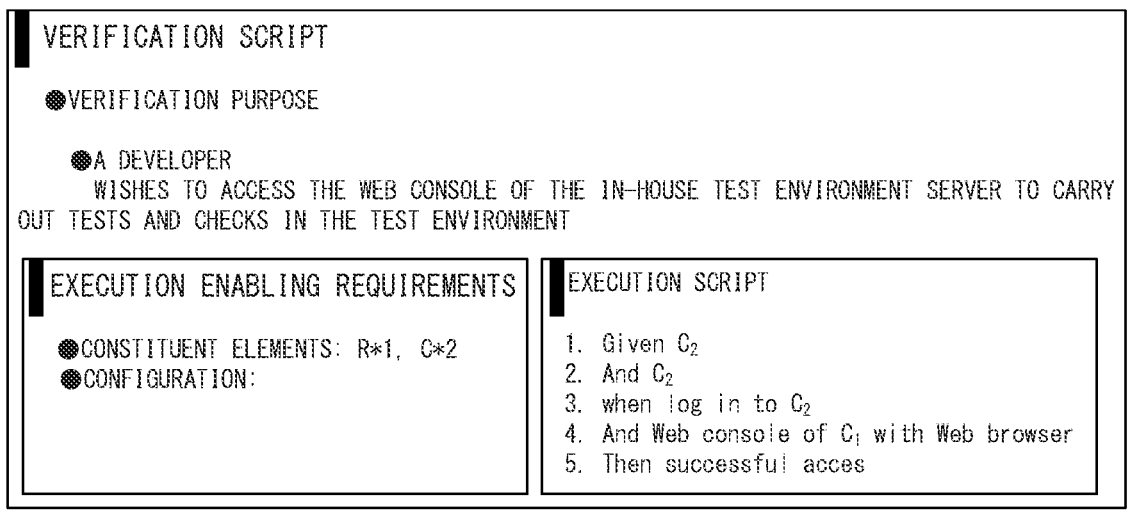
FIG. 3 is a diagram showing an example of a verification script used in the first example embodiment of the present invention.

Also, an envisaged purpose of verification may be added to the verification script. FIG. 3 shows an example of such a verification script. FIG. 3 is a diagram showing an example of a verification script used in the first example embodiment of the present invention. In the first example embodiment, the verification script need only include execution enabling requirements (constituent elements and configurations) and an execution script corresponding thereto, and the content of the verification script is not limited to the example in FIG. 3.

The verification script separation unit 102 is connected to the verification script acquisition unit 101, the verification configuration search unit 104, and the execution script materializing unit 105. The verification script separation unit 102 separates a verification script acquired by the verification script acquisition unit 101 into an execution enabling requirements and an execution script, and outputs the execution enabling requirements to the verification configuration search unit 104 and outputs the execution script to the execution script materializing unit 105.

Figure 4:
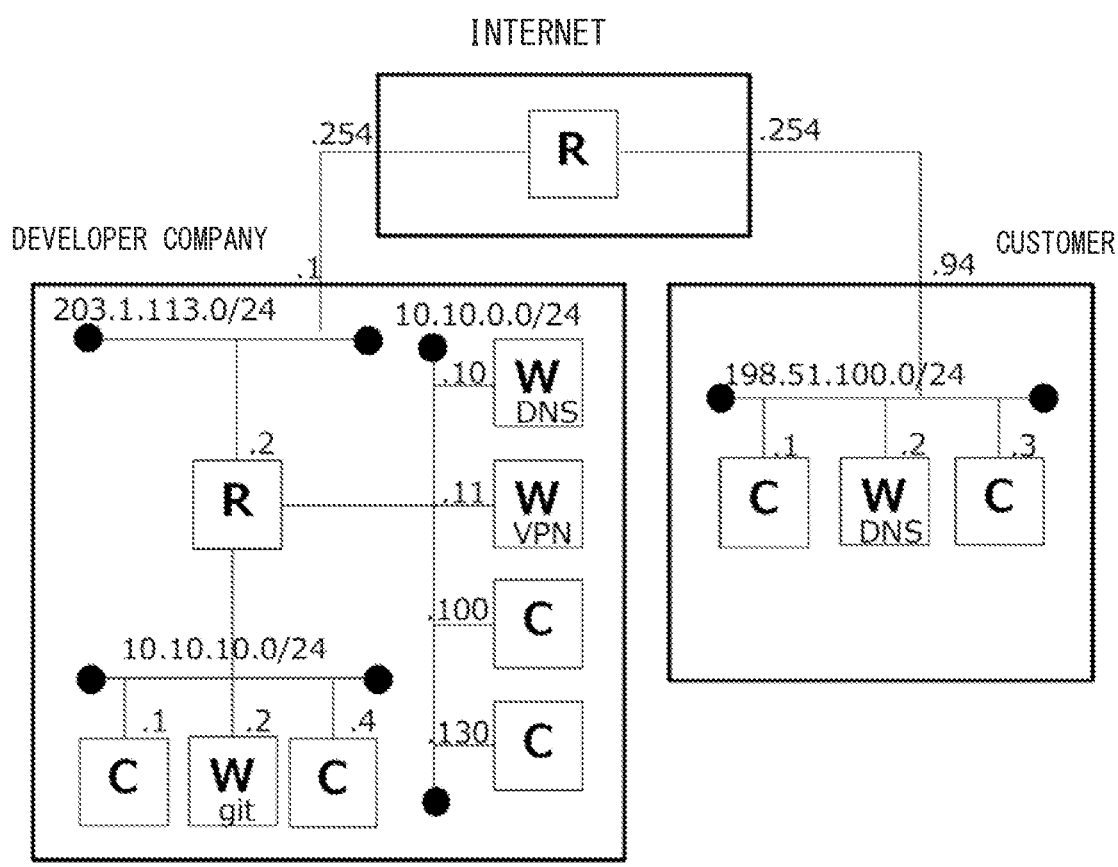
FIG. 4 is a diagram showing an example of environment information used in an example embodiment of the present invention.

The verification environment storage unit 103 stores environment information regarding the system to be verified. In other words, the verification environment storage unit 103 stores a configuration diagram of the entire verification environment in the format shown in FIG. 4, for example. FIG. 4 is a diagram showing an example of environment information used in an example embodiment of the present invention. As shown in FIG. 4, environment information includes information regarding the devices and the network included in the system to be verified, and defines the devices and the network using parameters.

Specifically, as shown in FIG. 4, the verification environment storage unit 103 stores, as environment information, the types of devices included in the verification environment, connection information regarding the network, and parameters related to the network such as an IP (Internet Protocol) address. Note that even if the above-described pieces of information are stored in the verification environment storage unit 103, environment information is not limited to the example in FIG. 4. Environment information may also include, for example, a MAC (Media Access Control) address, an available port numbers, specific model number information of devices, and so on.

In the first example embodiment, the verification configuration search unit 104 is connected to the verification script separation unit 102, the verification environment storage unit 103, and the execution script materializing unit 105. Upon receiving execution enabling requirements from the verification script separation unit 102, the verification configuration search unit 104 searches the verification environment storage unit 103 for a system configuration that satisfies the specified execution enabling requirements (see FIG. 4).

Specifically, the verification configuration search unit 104 searches for environment information based on the execution enabling requirements, and specifies a system configuration that satisfies the execution enabling requirements. At this time, the specified configuration is represented as parameters used in the environment information. Also, for example, an existing partial graph isomorphism determination algorithm may be used as a search algorithm in this case. The verification configuration search unit 104 extracts parameters for the configurations specified through the search, and outputs the extracted parameters to the execution script materializing unit 105.

Figure 5:
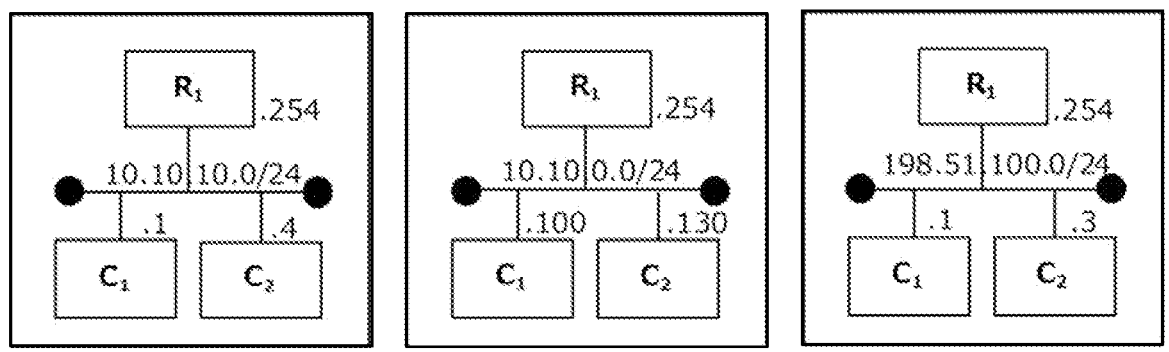
FIG. 5 is a diagram showing an example of a configuration of a system searched for in an example embodiment of the present invention.

FIG. 5 is a diagram showing an example of a configuration of a system searched for in an example embodiment of the present invention. The example in FIG. 5 shows a configuration (an output result) acquired through a search for the environment information shown in FIG. 4, performed based on the execution enabling requirements shown in FIG. 3. As shown in FIG. 5, the configuration that has been found is represented as parameters used in the environment information shown in FIG. 4. Note that representation of the configuration is not limited to the example shown in FIG. 5, and, for example, each network device shown in FIG. 4 may be represented as an IP address that is assigned thereto.

In the first example embodiment, the execution script materializing unit 105 is connected to the verification script separation unit 102, and the verification configuration search unit 104. In the present example embodiment, the execution script materializing unit 105 materializes the execution script by modifying the parameters included in the execution script, using the parameters that represent the configuration that has been found through the search.

Specifically, the execution script materializing unit 105 materializes the execution script by inputting the specific configuration information received from the verification configuration search unit 104, to the parameter section of the execution script received from the verification script separation unit 102. As a result, the execution script is executable in the system to be verified.

[Apparatus Operations]

Figure 6:
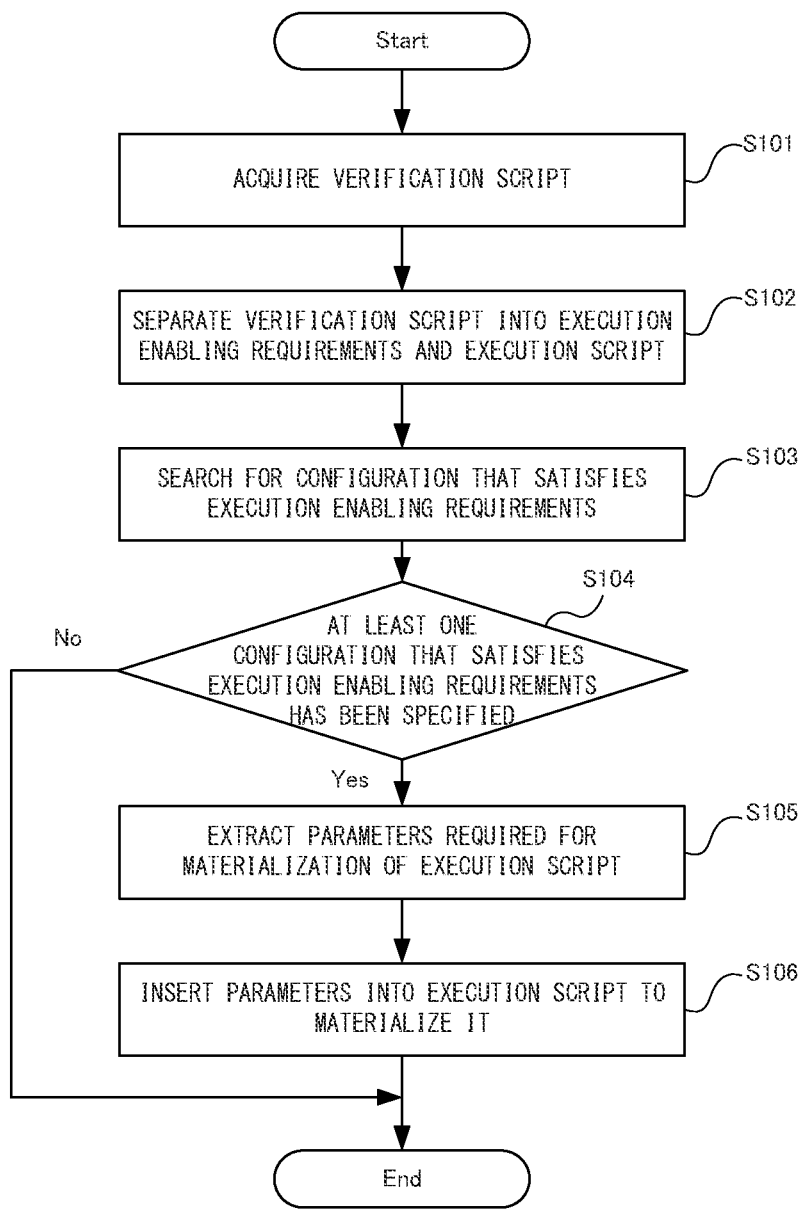
FIG. 6 is a flowchart showing operations of the verification automation apparatus according to the first example embodiment of the present invention.

Next, operations of the verification automation apparatus 1 according to the first example embodiment will be described with reference to FIG. 6. FIG. 6 is a flowchart showing operations of the verification automation apparatus according to the first example embodiment of the present invention. In the following description, FIGS. 1 to 4 are referenced when necessary. Also, in the first example embodiment, a verification automation method is carried out by operating the verification automation apparatus 1. Therefore, the following description of operations of the verification automation apparatus 1 substitutes for a description of the verification automation method in the first example embodiment.

As shown in FIG. 5, first, the verification script acquisition unit 101 acquires a verification script that includes execution enabling requirements and an execution script (step S101). The verification script acquisition unit 101 outputs the acquired verification script to the verification script separation unit 102.

Next, the verification script separation unit 102 separates the verification script acquired in step S101 into execution enabling requirements and an execution script (step S102). Also, the verification script separation unit 102 outputs the separated execution enabling requirements to the verification configuration search unit 104 and the separated execution script to the execution script materializing unit 105.

Next, the verification configuration search unit 104 searches for a system configuration that satisfies the execution enabling requirements (step S103). Specifically, in step S103, the verification configuration search unit 104 acquires environment information regarding the system to be verified, from the verification environment storage unit 103, and receives the execution enabling requirements from the verification script separation unit 102. Thereafter, the verification configuration search unit 104 searches for environment information based on the execution enabling requirements, and specifies system configuration that satisfies the execution enabling requirements. Also, the search in step S103 is performed using a partial graph isomorphism determination algorithm or the like, for example.

Next, the verification configuration search unit 104 determines whether or not at least one configuration that satisfies the execution enabling requirements has been specified through the search in step S103 (step S104). If it is determined in step S104 that it has been impossible to specify at least one configuration, the processing performed by the verification automation apparatus 1 ends. Also, in this case, the verification configuration search unit 104 determines that the verification script acquired in step S101 is not executable, and outputs an error.

On the other hand, if it is determined in step S104 that at least one configuration has been specified, the verification configuration search unit 104 extracts, for every specified configuration, the parameters that represent the configuration (step S105). The extracted parameters are necessary for script embodiment described below.

Next, the execution script materializing unit 105 inserts the parameters extracted in step S105 into the parameters of each execution script, to materialize the execution script (step S106). As a result, a set of execution scripts that are executable in the verification environment is generated.

Effects of First Example Embodiment

As described above, in the present example embodiment, a configuration that can satisfy the execution enabling requirements of the verification script in the verification environment is searched for, using the execution enabling requirements of the verification script and environment information regarding the system to be verified. The execution script is modified using the parameters of the configuration, and is materialized so as to be executable in the verification environment, without relying on manual operation. Therefore, with the first example embodiment, even if the verification environment is different from the environment in which the existing verification scripts were created, it is possible to reuse the existing verification scripts without manually modifying parameters.

[Program]

A program according to the first example embodiment need only be a program that enables a computer to execute the steps S101 to S106 shown in FIG. 6. It is possible to realize the verification automation apparatus 1 and the verification automation method according to the first example embodiment by installing this program to a computer and executing the program. In this case, a processor of the computer functions as the verification script acquisition unit 101, the verification script separation unit 102, the verification configuration search unit 104, and the execution script materializing unit 105, and performs processing. The verification environment storage unit 103 is realized by storing environment information in a storage device such as a hard disk provided in the computer.

The program according to the first example embodiment may also be executed by a computer system built from a plurality of computers. In this case, for example, each computer may function as the verification script acquisition unit 101, the verification script separation unit 102, the verification configuration search unit 104, or the execution script materializing unit 105. Also, the verification environment storage unit 103 may be built on a computer other than the computer that executes the program according to the first example embodiment.

Modifications

Figure 7:
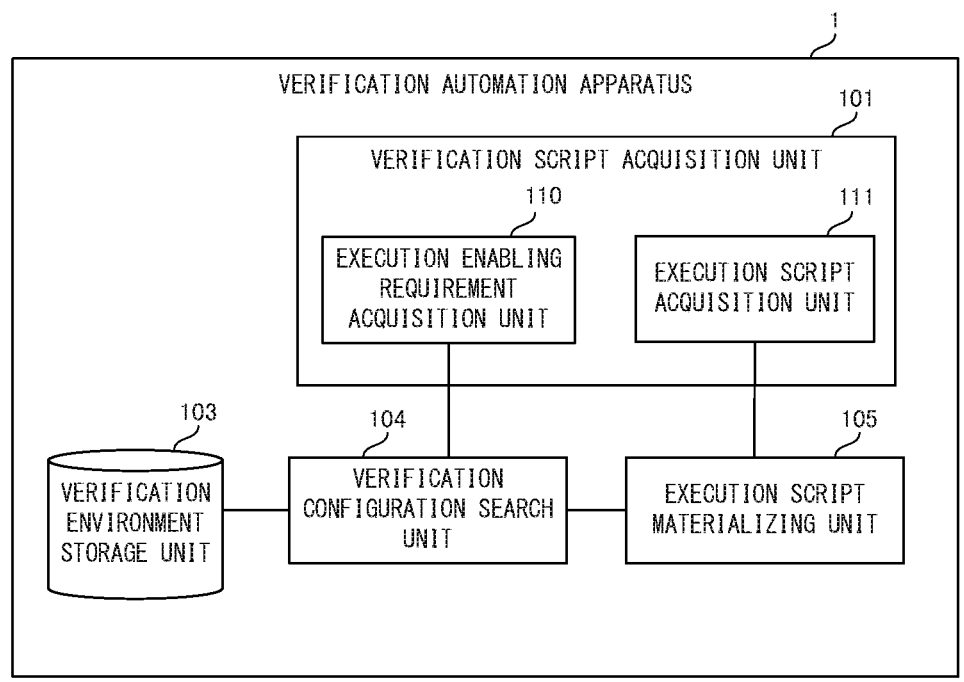
FIG. 7 is a block diagram showing a configuration of a modification of a verification automation apparatus according to an example embodiment of the present invention.

Here, a modification of the first example embodiment will be described with reference to FIG. 7. FIG. 7 is a block diagram showing a configuration of a modification of the verification automation apparatus according to an example embodiment of the present invention.

As shown in FIG. 7, this modification is not provided with the verification script separation unit 102, and instead the verification script acquisition unit 101 is provided with an execution enabling requirement acquisition unit 110 and an execution script acquisition unit 111.

In this case, the execution script acquisition unit 111 acquires an execution script and outputs the acquired execution script to the execution script materializing unit 105. The execution enabling requirement acquisition unit 110 only acquires execution enabling requirements and outputs the acquired execution enabling requirements to the verification configuration search unit 104. The execution enabling requirements acquired in this case correspond to the parameters of the execution script acquired by the execution script acquisition unit 111.

Second Example Embodiment

Next, a verification automation apparatus, a verification automation method, and a program according to a second example embodiment of the present invention will be described with reference to FIGS. 8 to 10.

[Apparatus Configuration]

First, a configuration of a verification automation apparatus according to the second example embodiment will be described with reference to FIGS. 8 and 9. FIG. 8 is a block diagram showing a configuration of the verification automation apparatus according to the second example embodiment of the present invention.

Figure 8:
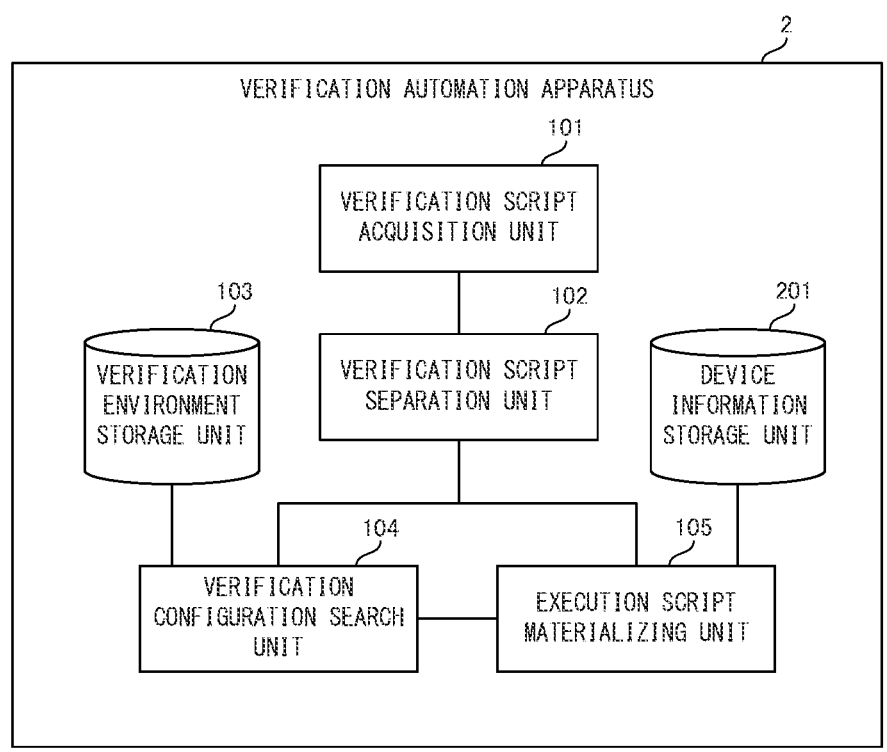
FIG. 8 is a block diagram showing a configuration of a verification automation apparatus according to a second example embodiment of the present invention.

As shown in FIG. 8, a verification automation apparatus 2 according to the second example embodiment includes a device information storage unit 201 in addition to the components included in the verification automation apparatus 1 according to the first example embodiment shown in FIG. 2. The verification automation apparatus 2 is different from the verification automation apparatus 1 according to the first example embodiment in this point. Also, the second example embodiment is different from the first example embodiment in the processing performed by the verification configuration search unit 104 and the execution script materializing unit 105 as well. The following mainly describes differences from the first example embodiment. Note that, in FIG. 8, the same constituent elements as the constituent elements shown in the first example embodiment are given the same reference numerals as those in FIGS. 1 and 2, and the details of such constituent elements are omitted.

The device information storage unit 201 stores device information. Device information includes a correspondence relationship between specific operations in the system to be verified and operational instructions that are unique to the devices included in the system to be verified. Specifically, as shown in FIG. 9, device information is information that indicates, for each specific operation, the portion of the execution script in which operational instructions vary depending on the vendor of the device, the operating system mounted on the device, and so on. FIG. 9 is a diagram showing an example of device information that is used in the second example embodiment of the present invention.

Note that the second example embodiment is applied to an example in which common operational instructions are set to the portion of the execution script in which operational instructions usually vary depending on the vendor of the device, the operating system, and so on. Device information is not limited to the example shown in FIG. 9. Device information may be a table in which pieces of information are classified for each type of device.

In the second example embodiment, upon specifying a system configuration that satisfies the execution enabling requirements through a search, the verification configuration search unit 104 extracts device information corresponding to the specified configuration from the device information storage unit 201. Also, the verification configuration search unit 104 outputs the extracted device information to the execution script materializing unit 105.

In the second example embodiment, the execution script materializing unit 105 first adapts the execution script to each device, based on the device information output from the verification configuration search unit 104. Thereafter, as in the first example embodiment, the execution script materializing unit 105 materializes the execution scripts by modifying the parameters included in the execution script, using the parameters that represent the configuration that has been found through the search.

[Apparatus Operations]

Next, operations of the verification automation apparatus 2 according to the second example embodiment will be described with reference to FIG. 10. FIG. 10 is a flowchart showing operations of the verification automation apparatus according to the second example embodiment of the present invention. In the following description, FIGS. 8 and 9 are referenced when necessary. Also, in the second example embodiment, a verification automation method is carried out by operating the verification automation apparatus 2. Therefore, the following description of operations of the verification automation apparatus 2 substitutes for a description of the verification automation method in the second example embodiment.

Figure 10:
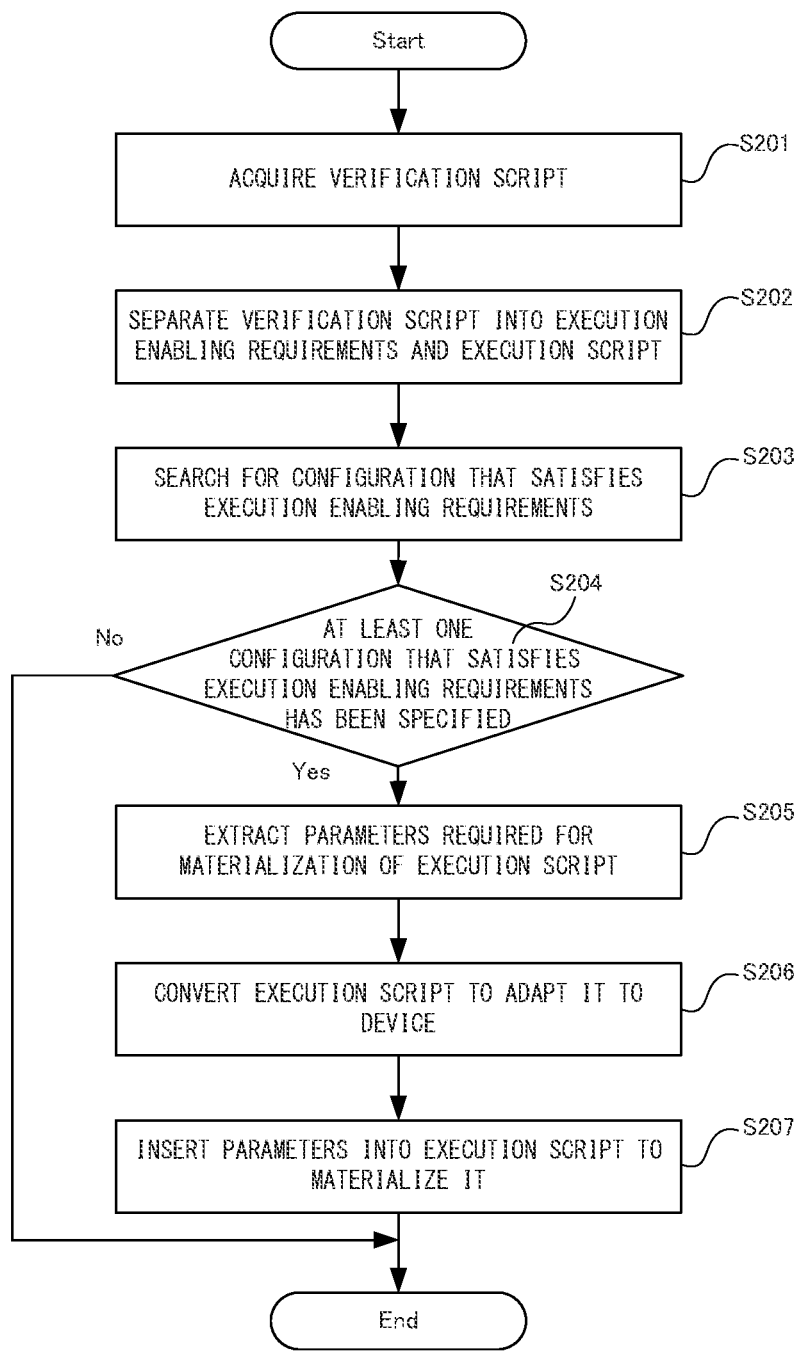
FIG. 10 is a flowchart showing operations of the verification automation apparatus according to the second example embodiment of the present invention.

As shown in FIG. 10, first, the verification script acquisition unit 101 acquires a verification script that includes execution enabling requirements and an execution script (step S201). Step S201 is the same step as the step S101 shown in FIG. 6.

Next, the verification script separation unit 102 separates the verification script acquired in step S201 into execution enabling requirements and an execution script (step S202). Step S202 is the same as the step S102 shown in FIG. 6.

Next, the verification configuration search unit 104 searches for a system configuration that satisfies the execution enabling requirements (step S203). Step S203 is the same step as the step S103 shown in FIG. 6.

Next, the verification configuration search unit 104 determines whether or not at least one configuration that satisfies the execution enabling requirements has been specified through the search in step S203 (step S204). Step S204 is the same step as the step S104 shown in FIG. 6.

If it is determined in step S204 that it has been impossible to specify at least one configuration, the processing performed by the verification automation apparatus 2 ends. In this case, the verification configuration search unit 104 determines that the verification script acquired in step S201 is not executable, and outputs an error.

On the other hand, if it determined in step S204 that at least one configuration has been specified, the verification configuration search unit 104 extracts, for every specified configuration, the parameters that represent the configuration, and device information corresponding thereto (step S205).

Next, the execution script materializing unit 105 converts the parameters of the execution script to adapt them to each device, with reference to the device information extracted in step S205 (step S206).

Next, the execution script materializing unit 105 inserts the parameters extracted in step S205 into the parameters of each execution script that has been subjected to the processing in step S206, to materialize the execution script (step S207). As a result, a set of execution scripts that are executable in the verification environment is generated.

Effects of Second Example Embodiment

As described above, the second example embodiment employs device information in which the portion of the execution script in which operational instructions vary depending on the vendor of the device, the operating system mounted on the device, and so on is specified for each type of operation. Also, the parameters of each execution script are converted to be adapted to the device corresponding thereto, based on device information. Therefore, according to the second example embodiment, it is possible to reuse the same verification script regardless of, for example, the vendor of the device, the type of the operating system or the like mounted on the device.

[Program]

A program according to the second example embodiment need only be a program that enables a computer to execute the steps S201 to S207 shown in FIG. 10. It is possible to realize the verification automation apparatus 2 and the verification automation method according to the second example embodiment by installing this program to a computer and executing the program. In this case, a processor of the computer functions as the verification script acquisition unit 101, the verification script separation unit 102, the verification configuration search unit 104, and the execution script materializing unit 105, and performs processing. The verification environment storage unit 103 and the device information storage unit 201 are realized by storing environment information in a storage device such as a hard disk provided in the computer.

The program according to the second example embodiment may also be executed by a computer system built from a plurality of computers. In this case, for example, each computer may function as the verification script acquisition unit 101, the verification script separation unit 102, the verification configuration search unit 104, or the execution script materializing unit 105. Also, the verification environment storage unit 103 and the device information storage unit 201 may be built on a computer other than the computer that executes the program according to the second example embodiment.

Third Example Embodiment

Next, a verification automation apparatus, a verification automation method, and a program according to a third example embodiment of the present invention will be described with reference to FIGS. 11 to 13.

[Apparatus Configuration]

First, a configuration of a verification automation apparatus according to the third example embodiment will be described with reference to FIGS. 11 and 12. FIG. 11 is a block diagram showing a configuration of the verification automation apparatus according to the third example embodiment of the present invention. FIG. 12 is a diagram showing examples of execution enabling requirements of a verification script used in the third example embodiment of the present invention.

Figure 11:
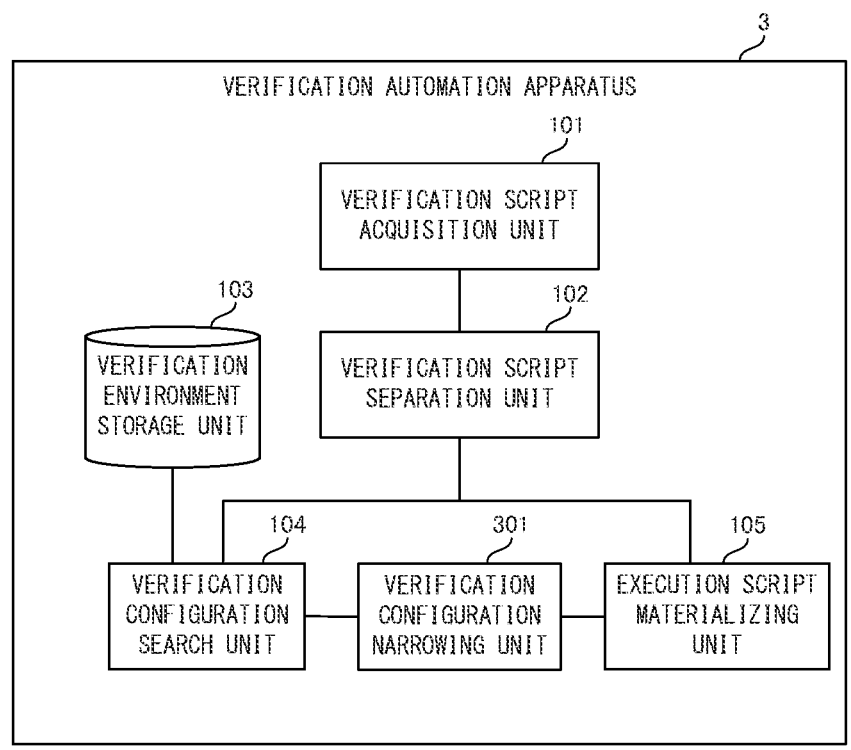
FIG. 11 is a block diagram showing a configuration of a verification automation apparatus according to a third example embodiment of the present invention.

As shown in FIG. 11, a verification automation apparatus 3 according to the third example embodiment includes a verification configuration narrowing unit 301 in addition to the components included in the verification automation apparatus 1 according to the first example embodiment shown in FIG. 2. The verification automation apparatus 3 is different from the verification automation apparatus 1 according to the first example embodiment in this point. The following mainly describes differences from the first example embodiment. Note that, in FIG. 12, the same constituent elements as the constituent elements shown in the first example embodiment are given the same reference numerals as those in FIGS. 1 and 2, and the details of such constituent elements are omitted.

Figure 12:
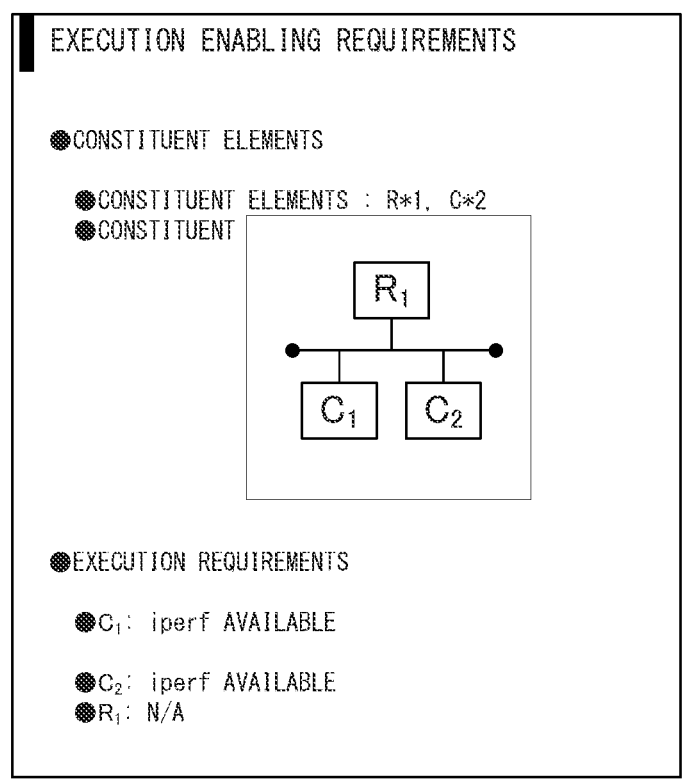
FIG. 12 is a diagram showing examples of execution enabling requirements of a verification script used in the third example embodiment of the present invention.

As shown in FIG. 12, the execution enabling requirements in the third example embodiment include configuration requirements and execution requirements. The configuration requirements of these requirements are the requirements shown in FIG. 3, and are required for the system to run an execution script. The execution requirements are requirements that are not shown in FIG. 3, and are requirements for the devices included in the system.

The verification configuration narrowing unit 301 is connected to the verification configuration search unit 104 and the execution script materializing unit 105 so as be able to communicate therewith. The verification configuration narrowing unit 301 determines whether or not the configurations found by the verification configuration search unit 104 satisfies the above-described execution requirements, and specifies a configuration that satisfies the execution requirements. Note that, in the third example embodiment, the execution requirements are not limited to the example shown in FIG. 13, and need only be information that can be used to narrow down the information acquired from the verification configuration search unit 104. The execution requirements may also be, for example, information that is to be set to each device included in the configuration found by the verification configuration search unit 104, communicableness between the devices, or the like.

[Apparatus Operations]

Next, operations of the verification automation apparatus 3 according to the third example embodiment will be described with reference to FIG. 13. FIG. 13 is a flowchart showing operations of the verification automation apparatus according to the third example embodiment of the present invention. In the following description, FIGS. 11 and 12 are referenced when necessary. Also, in the third example embodiment, a verification automation method is carried out by operating the verification automation apparatus 3. Therefore, the following description of operations of the verification automation apparatus 3 substitutes for a description of the verification automation method in the third example embodiment.

Figure 13:
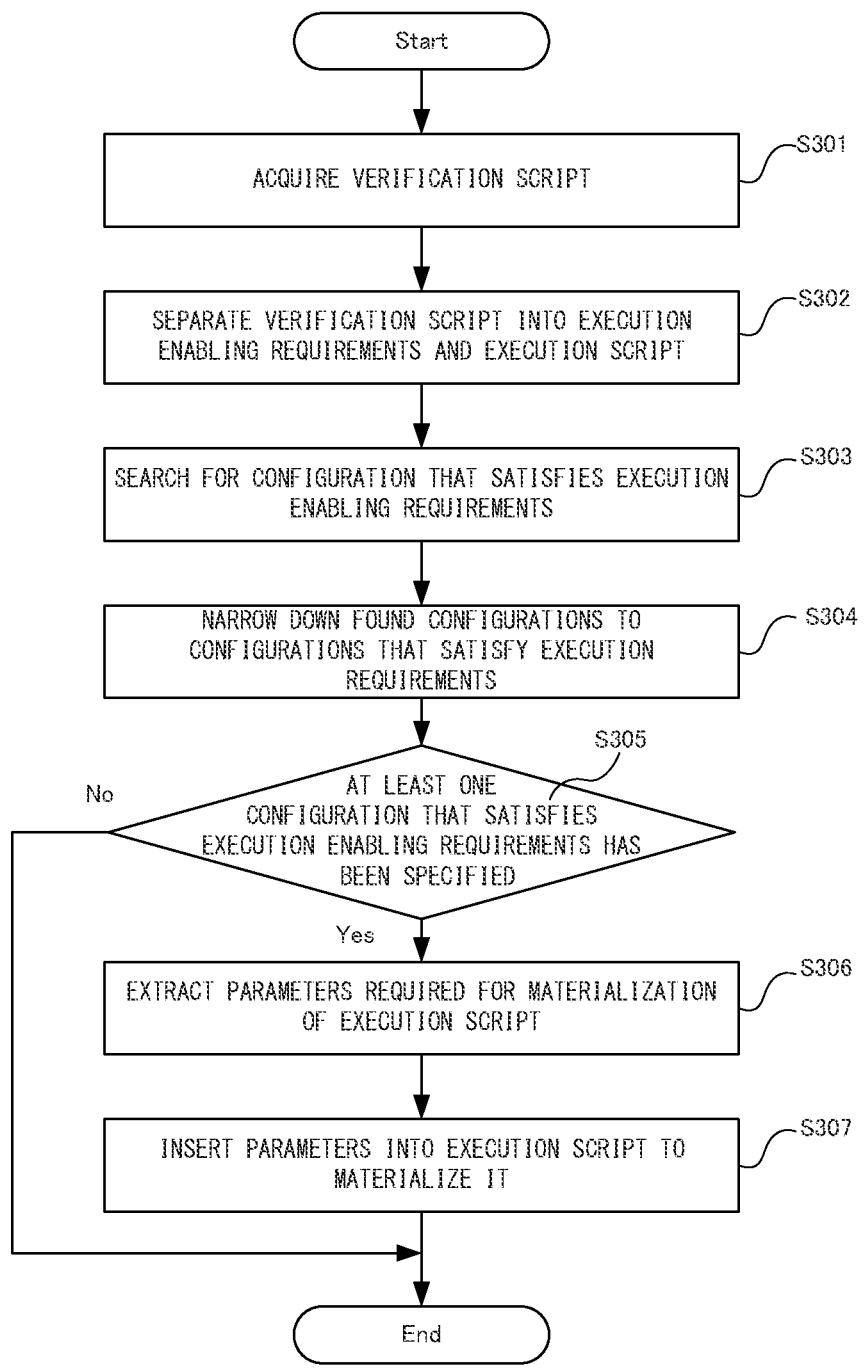
FIG. 13 is a flowchart showing operations of the verification automation apparatus according to the third example embodiment of the present invention.

As shown in FIG. 13, first, the verification script acquisition unit 101 acquires a verification script that includes execution enabling requirements and an execution script (step S301). Step S301 is the same step as the step S101 shown in FIG. 6.

Next, the verification script separation unit 102 separates the verification script acquired in step S301 into execution enabling requirements and an execution script (step S302). Step S302 is the same as the step S301 shown in FIG. 6.

Next, the verification configuration search unit 104 searches for a system configuration that satisfies the execution enabling requirements (step S303). Step S303 is the same step as the step S103 shown in FIG. 6. However, the verification configuration search unit 104 outputs the configurations specified through the search, to the verification configuration narrowing unit 301.

Next, the verification configuration narrowing unit 301 determines whether or not the configurations found in step S303 satisfy the execution requirements for the execution script, and narrows down the configurations to configurations that satisfy the execution requirements (step S304).

Next, the verification configuration search unit 104 determines whether or not at least one configuration that satisfies the execution enabling requirements has been specified after step S304 has been executed (step S305). Step S305 is the same step as the step S104 shown in FIG. 6.

If it is determined in step S305 that it has been impossible to specify at least one configuration, the processing performed by the verification automation apparatus 3 ends. In this case, the verification configuration search unit 104 determines that the verification script acquired in step S301 is not executable, and outputs an error.

On the other hand, if it is determined in step S305 that at least one configuration has been specified, the verification configuration search unit 104 extracts, for each of the configurations to which the configurations are narrowed down in step S304, the parameters that represent the configuration (step S306).

Next, the execution script materializing unit 105 inserts the parameters extracted in step S306 into the parameters of each execution script, to materialize the execution script (step S307). As a result, a set of execution scripts that are executable in the verification environment is generated.

Effects of Third Example Embodiment

As described above, in the third example embodiment, the execution enabling requirements include execution requirements, and therefore it is possible to exclude a configuration that includes a device that cannot perform execution, without executing the execution script. Therefore, the third example embodiment realizes more efficient verification.

[Program]

A program according to the third example embodiment need only be a program that enables a computer to execute the steps S301 to S307 shown in FIG. 13. It is possible to realize the verification automation apparatus 3 and the verification automation method according to the third example embodiment by installing this program to a computer and executing the program. In this case, a processor of the computer functions as the verification script acquisition unit 101, the verification script separation unit 102, the verification configuration search unit 104, the execution script materializing unit 105, and the verification configuration narrowing unit 301, and performs processing. The verification environment storage unit 103 is realized by storing environment information in a storage device such as a hard disk provided in the computer.

The program according to the third example embodiment may also be executed by a computer system built from a plurality of computers. In this case, for example, each computer may function as the verification script acquisition unit 101, the verification script separation unit 102, the verification configuration search unit 104, the execution script materializing unit 105, or the verification configuration narrowing unit 301. Also, the verification environment storage unit 103 may be built on a computer other than the computer that executes the program according to the third example embodiment.

Fourth Example Embodiment

Next, a verification automation apparatus, a verification automation method, and a program according to a fourth example embodiment of the present invention will be described with reference to FIGS. 14 and 15.

[Apparatus Configuration]

First, a configuration of a verification automation apparatus according to the fourth example embodiment will be described with reference to FIG. 14. FIG. 14 is a block diagram showing a configuration of the verification automation apparatus according to the fourth example embodiment of the present invention.

Figure 14:
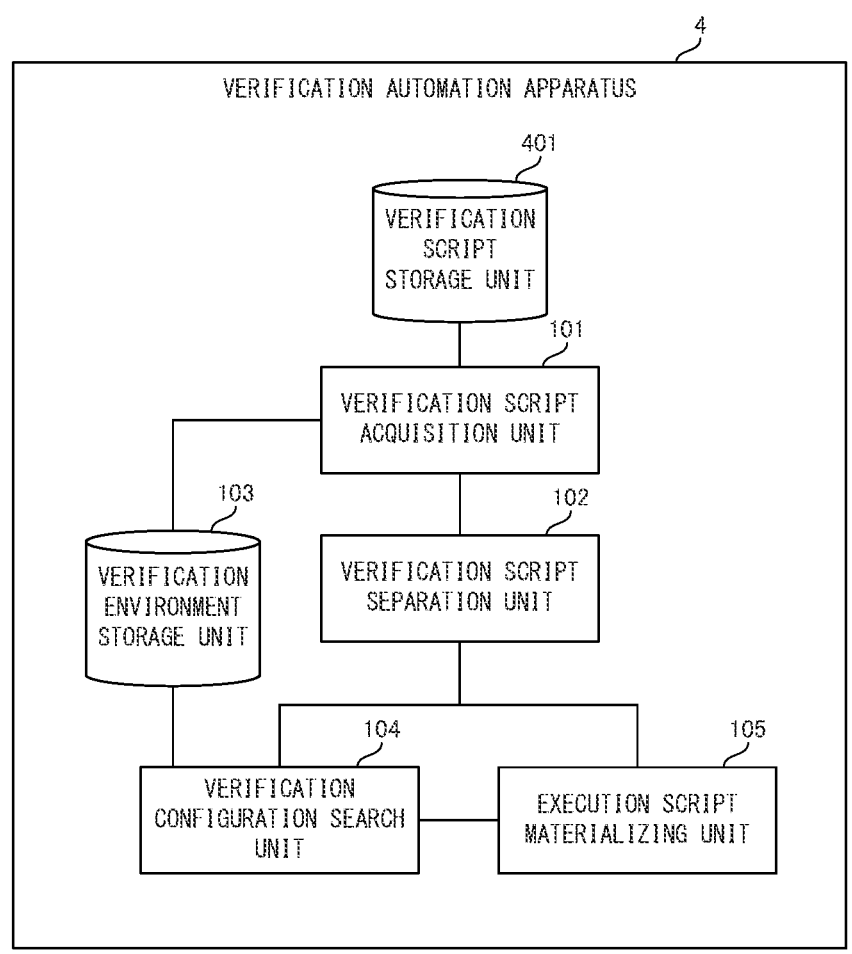
FIG. 14 is a block diagram showing a configuration of a verification automation apparatus according to a fourth example embodiment of the present invention.

As shown in FIG. 14, a verification automation apparatus 4 according to the fourth example embodiment includes a verification script storage unit 401 in addition to the components included in the verification automation apparatus 1 according to the first example embodiment shown in FIG. 2. The verification automation apparatus 4 is different from the verification automation apparatus 1 according to the first example embodiment in this point. The fourth example embodiment is also different form the first example embodiment in the functions of the verification script acquisition unit 101. The following mainly describes differences from the first example embodiment. Note that, in FIG. 14, the same constituent elements as the constituent elements shown in the first example embodiment are given the same reference numerals as those in FIGS. 1 and 2, and the details of such constituent elements are omitted.

The verification script storage unit 401 is connected to the verification script acquisition unit 101. The verification script storage unit 401 stores a plurality of verification scripts (see FIG. 3) prepared in advance, as a database.

In the fourth example embodiment, the verification script acquisition unit 101 selects a specific verification script from among the plurality of verification scripts stored in the verification script storage unit 401, and acquires the selected verification script.

[Apparatus Operations]

Next, operations of the verification automation apparatus 4 according to the fourth example embodiment will be described with reference to FIG. 15. FIG. 15 is a flowchart showing operations of the verification automation apparatus according to the fourth example embodiment of the present invention. In the following description, FIG. 14 is referenced when necessary. Also, in the fourth example embodiment, a verification automation method is carried out by operating the verification automation apparatus 4. Therefore, the following description of operations of the verification automation apparatus 4 substitutes for a description of the verification automation method in the fourth example embodiment.

Figure 15:
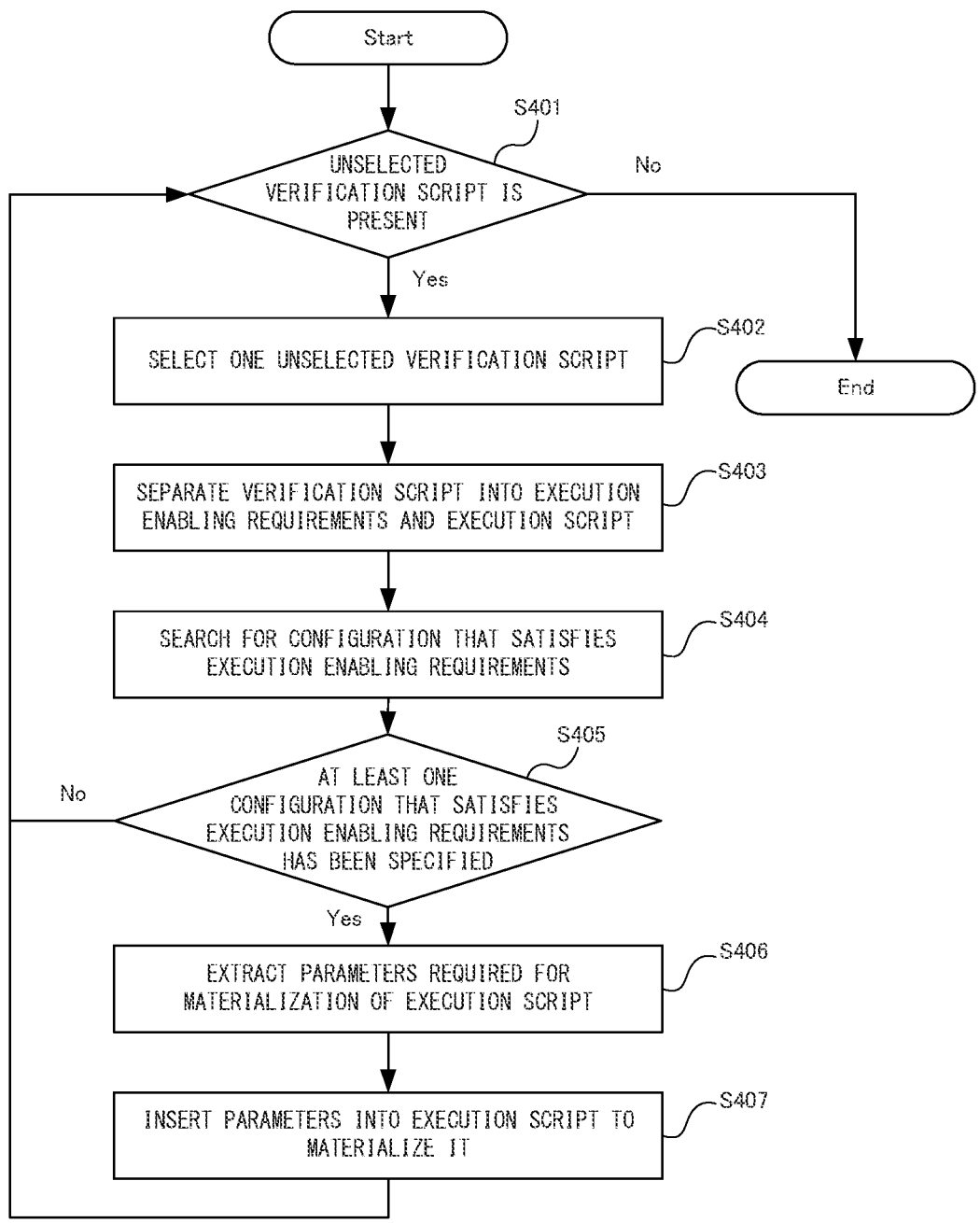
FIG. 15 is a flowchart showing operations of the verification automation apparatus according to the fourth example embodiment of the present invention.

As shown in FIG. 15, first, the verification script acquisition unit 101 determines whether or not a verification script that has not been selected in step S402 described below is present in the verification scripts stored in the verification script storage unit 401 (step S401).

If it is determined in step S401 that a verification script that has not been selected is not present (if all of the verification scripts have been selected), the processing performed by the verification automation apparatus 4 ends.

On the other hand, if it is determined in step S401 that verification scripts that have not been selected are present, the verification script acquisition unit 101 selects one of such verification scripts, and acquires the selected verification script (step S402). Also, the verification script acquisition unit 101 outputs the selected verification script to the verification script separation unit 102.

Next, the verification script separation unit 102 separates the verification script acquired in step S402 into execution enabling requirements and an execution script (step S403). Step S403 is the same step as the step S101 shown in FIG. 6.

Next, the verification configuration search unit 104 searches for a system configuration that satisfies the execution enabling requirements (step S404). Step S404 is the same step as the step S103 shown in FIG. 6.

Next, the verification configuration search unit 104 determines whether or not at least one configuration that satisfies the execution enabling requirements has been specified through the search performed in step S404 (step S405). Step S405 is the same step as the step S104 shown in FIG. 6.

If it is determined in step S405 that it has been impossible to specify at least one configuration, the above-described step S401 is performed again.

On the other hand, if it is determined in step S405 that at least one configuration has been specified, the verification configuration search unit 104 extracts, for every specified configuration, the parameters that represent the configuration (step S406). Step S406 is the same step as the step S105 shown in FIG. 6.

Next, the execution script materializing unit 105 inserts the parameters extracted in step S406 into the parameters of each execution script, to materialize the execution script (step S407). Step S407 is the same step as the step S106 shown in FIG. 6. As a result, a set of execution scripts that are executable in the verification environment is generated.

Effects of Fourth Example Embodiment

As described above, in the fourth example embodiment, the verification scripts that have been created so far are recorded in the verification script storage unit 401, and the execution script is materialized for each verification script. Therefore, with the fourth example embodiment, all of the existing executable verification scripts are automatically executed without the user selecting a verification script suitable for the verification environment.

[Program]

A program according to the fourth example embodiment need only be a program that enables a computer to execute the steps S401 to S407 shown in FIG. 15. It is possible to realize the verification automation apparatus 4 and the verification automation method according to the fourth example embodiment by installing this program to a computer and executing the program. In this case, a processor of the computer functions as the verification script acquisition unit 101, the verification script separation unit 102, the verification configuration search unit 104, and the execution script materializing unit 105, and performs processing. The verification environment storage unit 103 and the verification script storage unit 401 are realized by storing environment information in a storage device such as a hard disk provided in the computer.

The program according to the fourth example embodiment may also be executed by a computer system built from a plurality of computers. In this case, for example, each computer may function as the verification script acquisition unit 101, the verification script separation unit 102, the verification configuration search unit 104, or the execution script materializing unit 105. Also, the verification environment storage unit 103 and the verification script storage unit 401 may be built on a computer other than the computer that executes the program according to the fourth example embodiment.

Fifth Example Embodiment

Next, a verification automation apparatus, a verification automation method, and a program according to a fifth example embodiment of the present invention will be described with reference to FIGS. 16 to 19.

[Apparatus Configuration]

Figure 16:
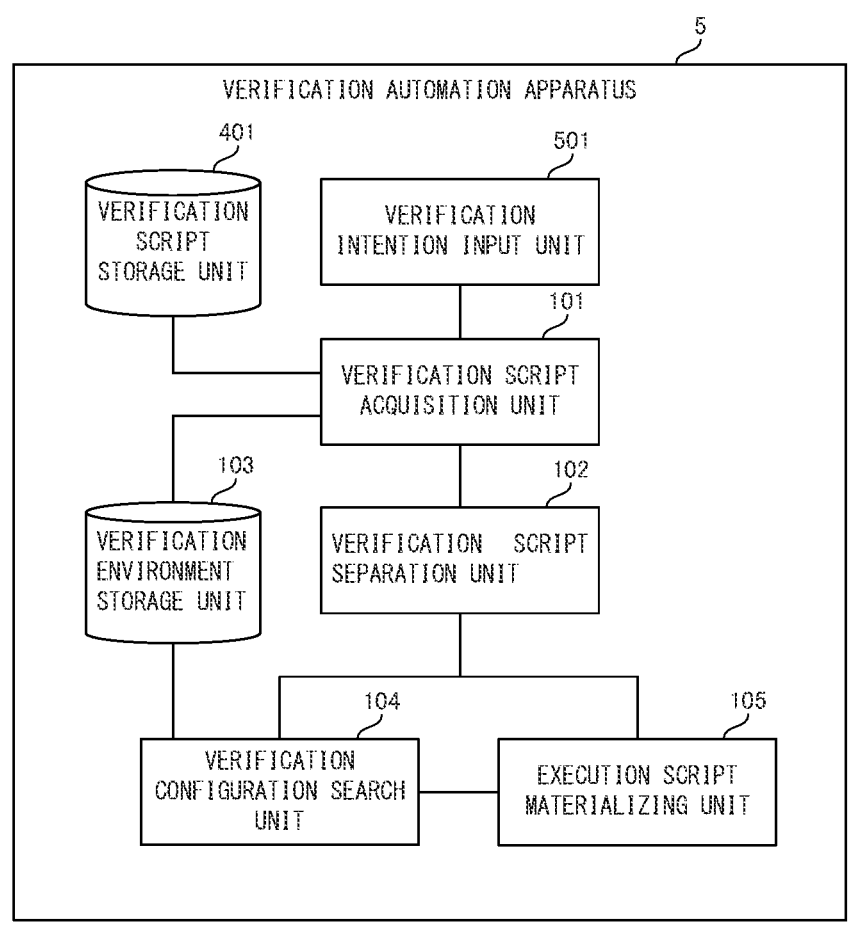
FIG. 16 is a block diagram showing a configuration of a verification automation apparatus according to a fifth example embodiment of the present invention.

First, a configuration of a verification automation apparatus according to the fifth example embodiment will be described with reference to FIGS. 16 to 18. FIG. 16 is a block diagram showing a configuration of the verification automation apparatus according to the fifth example embodiment of the present invention.

As shown in FIG. 16, a verification automation apparatus 5 according to the fifth example embodiment includes a verification intention input unit 501 in addition to the components included in the verification automation apparatus 4 according to the fourth example embodiment shown in FIG. 14. The verification automation apparatus 5 is different from the verification automation apparatus 4 according to the fourth example embodiment in this point. The following mainly describes differences from the fourth example embodiment. Note that, in FIG. 16, the same constituent elements as the constituent elements shown in the fourth example embodiment are given the same reference numerals as those in FIG. 14, and the details of such constituent elements are omitted.

First, the fifth example embodiment is also provided with the verification script storage unit 401 as with the fourth example embodiment. However, as shown in FIG. 17, in addition to the verification purpose (see FIG. 3), an intention in creating the verification script (hereinafter denoted as a "verification intention") is added to each verification script stored therein. FIG. 17 is a diagram showing an example of a verification script used in the fifth example embodiment of the present invention.

The verification intention input unit 501 is connected to the verification script acquisition unit 101. The verification intention input unit 501 inputs an intention regarding verification of the system to be verified, such as a verification intention in the format shown in FIG. 18, to the verification script acquisition unit 101 according to an instruction from the user. FIG. 18 is a diagram showing an example of an input verification intention in the fifth example embodiment of the present invention.

In the fifth example embodiment, the verification script acquisition unit 101 is also connected to the verification intention input unit 501. Therefore, the verification script acquisition unit 101 selects all of the verification scripts corresponding to the verification intention input by the verification intention input unit 501, from the verification script storage unit 401, and acquires such verification scripts. Also, the verification script acquisition unit 101 outputs the acquired verification scripts to the verification script separation unit 102.

Figure 18:
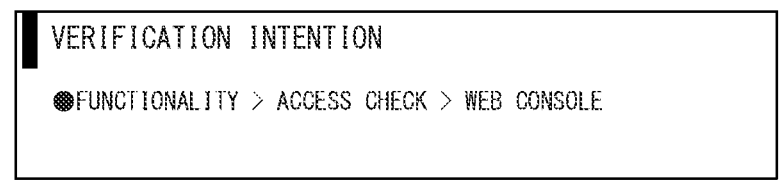
FIG. 18 is a diagram showing an example of an input verification intention in the fifth example embodiment of the present invention.

Note that, in the fifth example embodiment, the format of the verification intention is not limited to the example shown in FIG. 18. The verification intention may include a plurality of keywords. In this case, the verification script acquisition unit 101 searches all of the verification script stored in the verification script storage unit 401, using all of the keywords as a query, specifies a verification script corresponding to the verification intention, and selects the specified verification script.

[Apparatus Operations]

Figure 19:
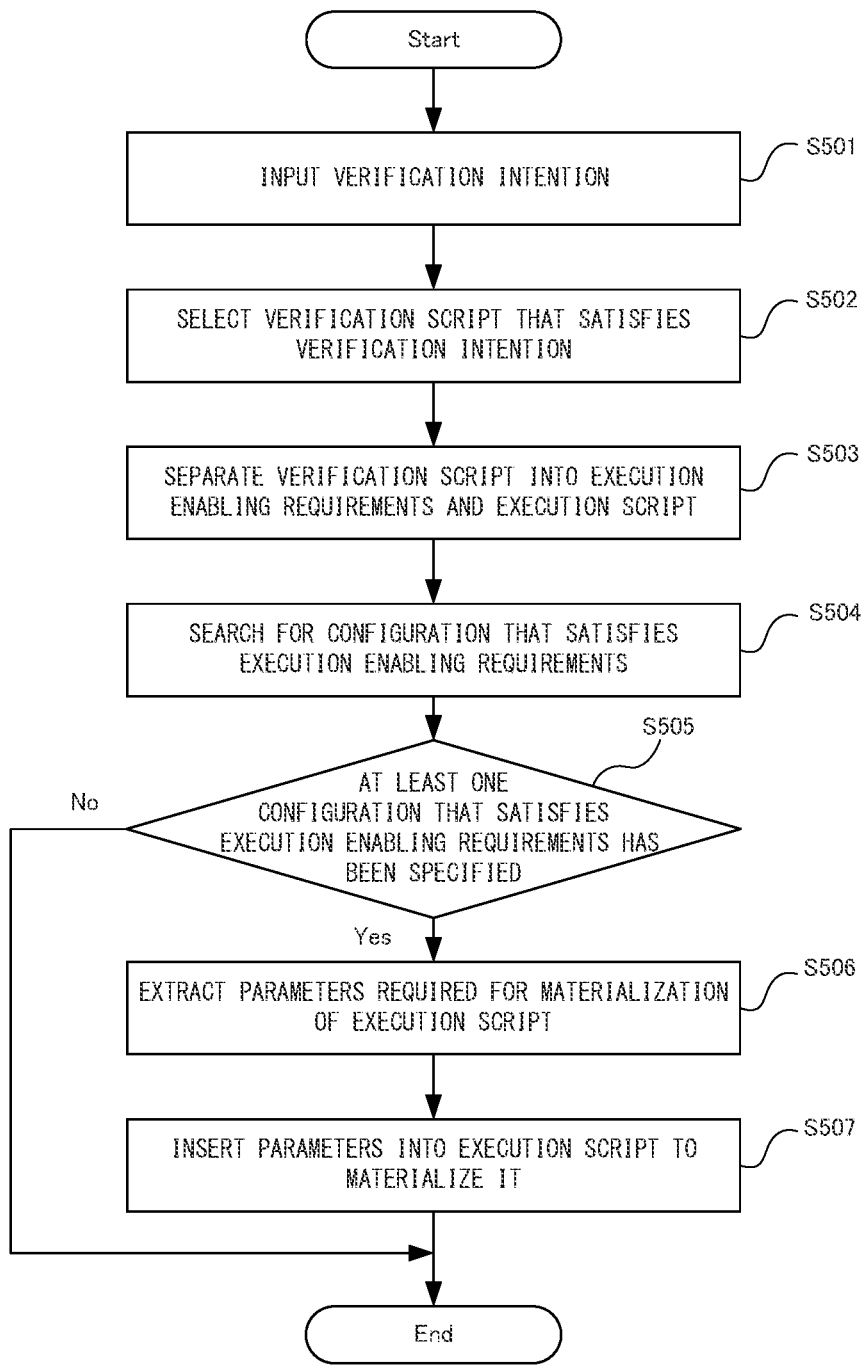
FIG. 19 is a flowchart showing operations of the verification automation apparatus according to the fifth example embodiment of the present invention.

Next, operations of the verification automation apparatus 5 according to the fifth example embodiment will be described with reference to FIG. 19. FIG. 19 is a flowchart showing operations of the verification automation apparatus according to the fifth example embodiment of the present invention. In the following description, FIGS. 16 to 18 are referenced when necessary. Also, in the fifth example embodiment, a verification automation method is carried out by operating the verification automation apparatus 5. Therefore, the following description of operations of the verification automation apparatus 5 substitutes for a description of the verification automation method in the fifth example embodiment.

As shown in FIG. 19, first, the verification intention input unit 501 inputs a verification intention for the system to be verified, to the verification script acquisition unit 101, according to an instruction from the user (step S501).

Next, the verification script acquisition unit 101 searches the verification script storage unit 401 for all the verification scripts corresponding to the verification intention input in step S501, and selects the verification scripts that have been found (step S502). Also, the verification script acquisition unit 101 outputs the selected verification scripts to the verification script separation unit 102.

Next, the verification script separation unit 102 separates each verification script selected in step S502 into execution enabling requirements and an execution script (step S503). Step S503 is the same step as the step S101 shown in FIG. 6.

Next, the verification configuration search unit 104 searches for a system configuration that satisfies the execution enabling requirements (step S504). Step S504 is the same step as the step S103 shown in FIG. 6.

Next, the verification configuration search unit 104 determines whether or not at least one configuration that satisfies the execution enabling requirements has been specified through the search performed in step S504 (step S505). Step S505 is the same step as the step S104 shown in FIG. 6.

If it is determined in step S505 that it has been impossible to specify at least one configuration, processing performed by the verification automation apparatus 5 ends.

On the other hand, if it is determined in step S505 that at least one configuration has been specified, the verification configuration search unit 104 extracts, for every specified configuration, the parameters that represent the configuration (step S506). Step S506 is the same step as the step S105 shown in FIG. 6.

Next, the execution script materializing unit 105 inserts the parameters extracted in step S506 into the parameters of each execution script, to materialize the execution script (step S507). Step S507 is the same step as the step S106 shown in FIG. 6. As a result, a set of execution scripts that are executable in the verification environment is generated.

Effects of Fifth Example Embodiment

As described above, in the fifth example embodiment, verification scripts used for verification are searched for according to the verification intention added to each verification script. That is to say, according to the fifth example embodiment, it is possible to search for verification scripts for each verification intention, and therefore it is possible to efficiently find the verification scripts to be used in verification of the system.

[Program]

A program according to the fifth example embodiment need only be a program that enables a computer to execute the steps S501 to S507 shown in FIG. 19. It is possible to realize the verification automation apparatus 5 and the verification automation method according to the fifth example embodiment by installing this program to a computer and executing the program. In this case, a processor of the computer functions as the verification script acquisition unit 101, the verification script separation unit 102, the verification configuration search unit 104, the execution script materializing unit 105, and the verification intention input unit 501, and performs processing. The verification environment storage unit 103 and the verification script storage unit 401 are realized by storing environment information in a storage device such as a hard disk provided in the computer.

The program according to the fifth example embodiment may also be executed by a computer system built from a plurality of computers. In this case, for example, each computer may function as the verification script acquisition unit 101, the verification script separation unit 102, the verification configuration search unit 104, the execution script materializing unit 105, or the verification intention input unit 501. Also, the verification environment storage unit 103 and the verification script storage unit 401 may be built on a computer other than the computer that executes the program according to the fifth example embodiment.

Sixth Example Embodiment

Next, a verification automation apparatus, a verification automation method, and a program according to a sixth example embodiment of the present invention will be described with reference to FIGS. 20 and 21.

[Apparatus Configuration]

First, a configuration of a verification automation apparatus according to the sixth example embodiment will be described with reference to FIG. 20. FIG. 20 is a block diagram showing a configuration of the verification automation apparatus according to the sixth example embodiment of the present invention.

Figure 20:
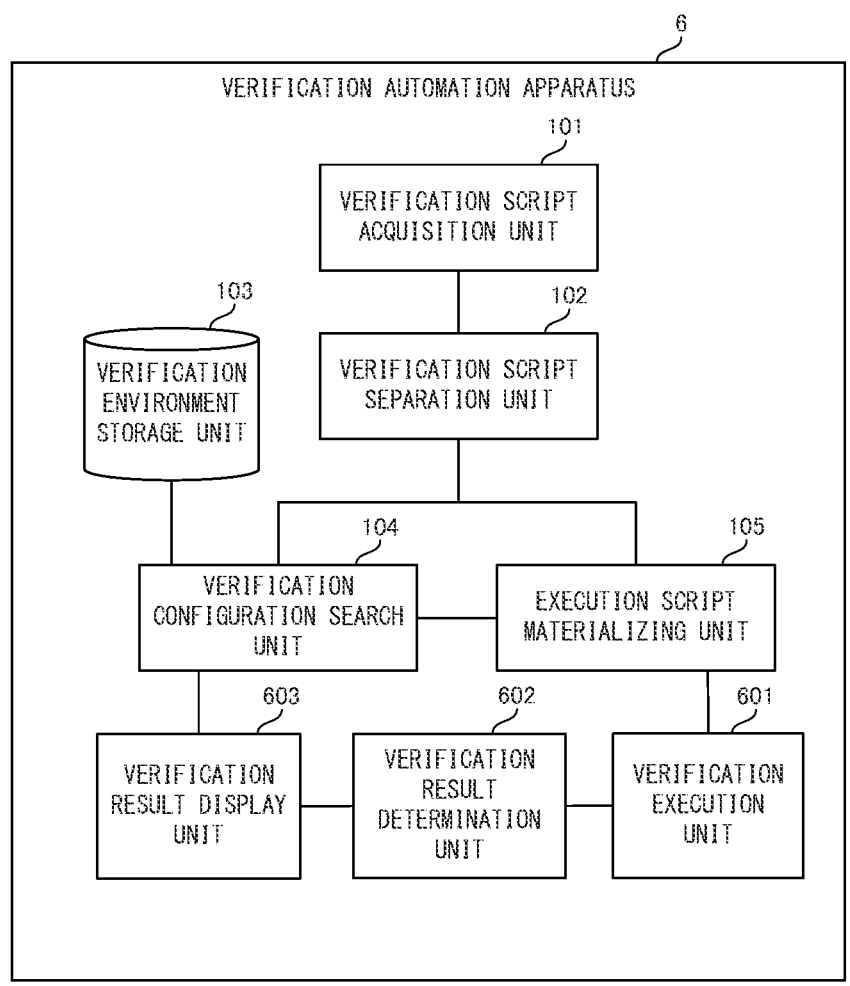
FIG. 20 is a block diagram showing a configuration of a verification automation apparatus according to a sixth example embodiment of the present invention.

As shown in FIG. 20, a verification automation apparatus 6 according to the sixth example embodiment includes a verification execution unit 601, a verification result determination unit 602, and a verification result display unit 603 in addition to the components included in the verification automation apparatus 1 according to the first example embodiment shown in FIG. 2. The verification automation apparatus 6 according to the sixth example embodiment is different from the verification automation apparatus 1 according to the first example embodiment in this point. The following mainly describes differences from the first example embodiment. Note that, in FIG. 20, the same constituent elements as the constituent elements shown in the first example embodiment are given the same reference numerals as those in FIGS. 1 and 2, and the details of such constituent elements are omitted.

The verification execution unit 601 acquires a verification script in which an execution script has been materialized by the execution script materializing unit 105, and executes the execution script to verify the system to be verified. In addition, the verification execution unit 601 also sets up a verification configuration, and deletes a verification configuration, for example.

The verification result determination unit 602 performs determination on the result of execution of the execution script by the verification execution unit 601. Specifically, the verification result determination unit 602 determines whether or not the verification is successful by checking whether or not the result of execution satisfies a predetermined determination criterion.

The verification result display unit 603 displays the result of determination by the verification result determination unit 602 on the screen of a terminal device or the like of the user, as the result of verification. The verification result display unit 603 may also display the configuration specified by the verification configuration search unit 104 on the screen, together with the result of verification.

[Apparatus Operations]

Next, operations of the verification automation apparatus 6 according to the sixth example embodiment will be described with reference to FIG. 21. FIG. 21 is a flowchart showing operations of the verification automation apparatus according to the sixth example embodiment of the present invention. In the following description, FIG. 20 is referenced when necessary. Also, in the sixth example embodiment, a verification automation method is carried out by operating the verification automation apparatus 6. Therefore, the following description of operations of the verification automation apparatus 6 substitutes for a description of the verification automation method in the sixth example embodiment.

Figure 21:
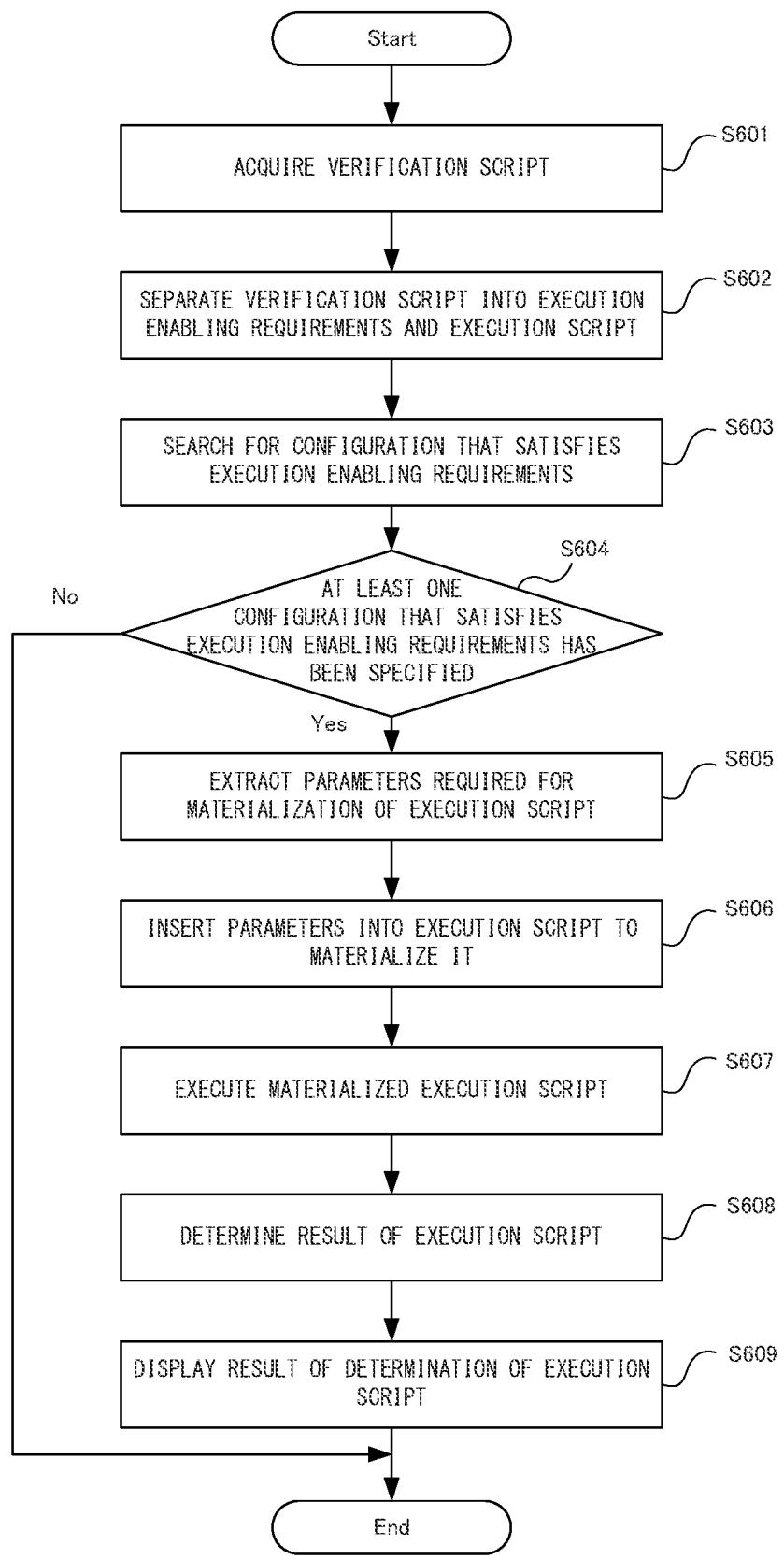
FIG. 21 is a flowchart showing operations of the verification automation apparatus according to the sixth example embodiment of the present invention.

As shown in FIG. 21, first, the verification script acquisition unit 101 acquires a verification script that includes execution enabling requirements and an execution script (step S601). Step S601 is the same step as the step S101 shown in FIG. 6.

Next, the verification script separation unit 102 separates the verification script acquired in step S601 into execution enabling requirements and an execution script (step S602). Step S602 is the same as the step S102 shown in FIG. 6.

Next, the verification configuration search unit 104 searches for a system configuration that satisfies the execution enabling requirements (step S603). Step S603 is the same step as the step S103 shown in FIG. 6.

Next, the verification configuration search unit 104 determines whether or not at least one configuration that satisfies the execution enabling requirements has been specified through the search in step S603 (step S604). Step S604 is the same step as the step S104 shown in FIG. 6.

If it is determined in step S604 that it has been impossible to specify at least one configuration, step S609 described below is performed.

On the other hand, if at least one configuration has been specified as a result of the determination in step S604, the verification configuration search unit 104 extracts, for every specified configuration, the parameters that represent the configuration (step S605). Step S605 is the same step as the step S105 shown in FIG. 6.

Next, the execution script materializing unit 105 inserts the parameters extracted in step S605 into the parameters of each execution script, to materialize the execution script (step S606). Step S606 is the same step as the step S106 shown in FIG. 6. As a result, a set of execution scripts that are executable in the verification environment is generated. The execution script materializing unit 105 also outputs the verification script including the materialized execution scripts to the verification execution unit 601.

Next, the verification execution unit 601 receives the verification script including the execution scripts materialized in step S606, and executes the execution scripts included in the verification script (step S607).

Next, the verification result determination unit 602 performs determination on the result of the execution in step S607 (step S608). Specifically, the verification result determination unit 602 determines whether or not the verification is successful, based on the result of execution.

Next, the verification result display unit 603 displays the result of determination in step S608 on the screen of a terminal device or the like of the user, as the result of verification (step S609). If it is determined in step S604 that it has been impossible to specify at least one configuration, the verification result display unit 603, in step S603, displays the result of verification "Failed" regarding the verification script for which the verification configuration search unit 104 could not specify a configuration that satisfies the execution enabling requirements.

Effects of Sixth Example Embodiment

As described above, in the sixth example embodiment, upon an execution script being materialized, the materialized execution script is executed, and thereafter the result of execution is displayed on the screen. That is to say, according to the sixth example embodiment, all of the operations from the adaptation to the verification environment of the verification script, to the execution of the execution script and the display of the result, are automatically performed.

[Program]

A program according to the sixth example embodiment need only be a program that enables a computer to execute the steps S601 to S609 shown in FIG. 21. It is possible to realize the verification automation apparatus 6 and the verification automation method according to the sixth example embodiment by installing this program to a computer and executing the program. In this case, a processor of the computer functions as the verification script acquisition unit 101, the verification script separation unit 102, the verification configuration search unit 104, the execution script materializing unit 105, the verification execution unit 601, the verification result determination unit 602, and the verification result display unit 603, and performs processing. The verification environment storage unit 103 is realized by storing environment information in a storage device such as a hard disk provided in the computer.

The program according to the sixth example embodiment may also be executed by a computer system built from a plurality of computers. In this case, for example, each computer may function as the verification script acquisition unit 101, the verification script separation unit 102, the verification configuration search unit 104, the execution script materializing unit 105, the verification execution unit 601, the verification result determination unit 602, or the verification result display unit 603. Also, the verification environment storage unit 103 may be built on a computer other than the computer that executes the program according to the sixth example embodiment.

Seventh Example Embodiment

Next, a verification automation apparatus, a verification automation method, and a program according to a seventh example embodiment of the present invention will be described with reference to FIGS. 22 to 24.

[Apparatus Configuration]

First, a configuration of a verification automation apparatus according to the seventh example embodiment will be described with reference to FIG. 22. FIG. 22 is a block diagram showing a configuration of the verification automation apparatus according to the seventh example embodiment of the present invention.

Figure 22:
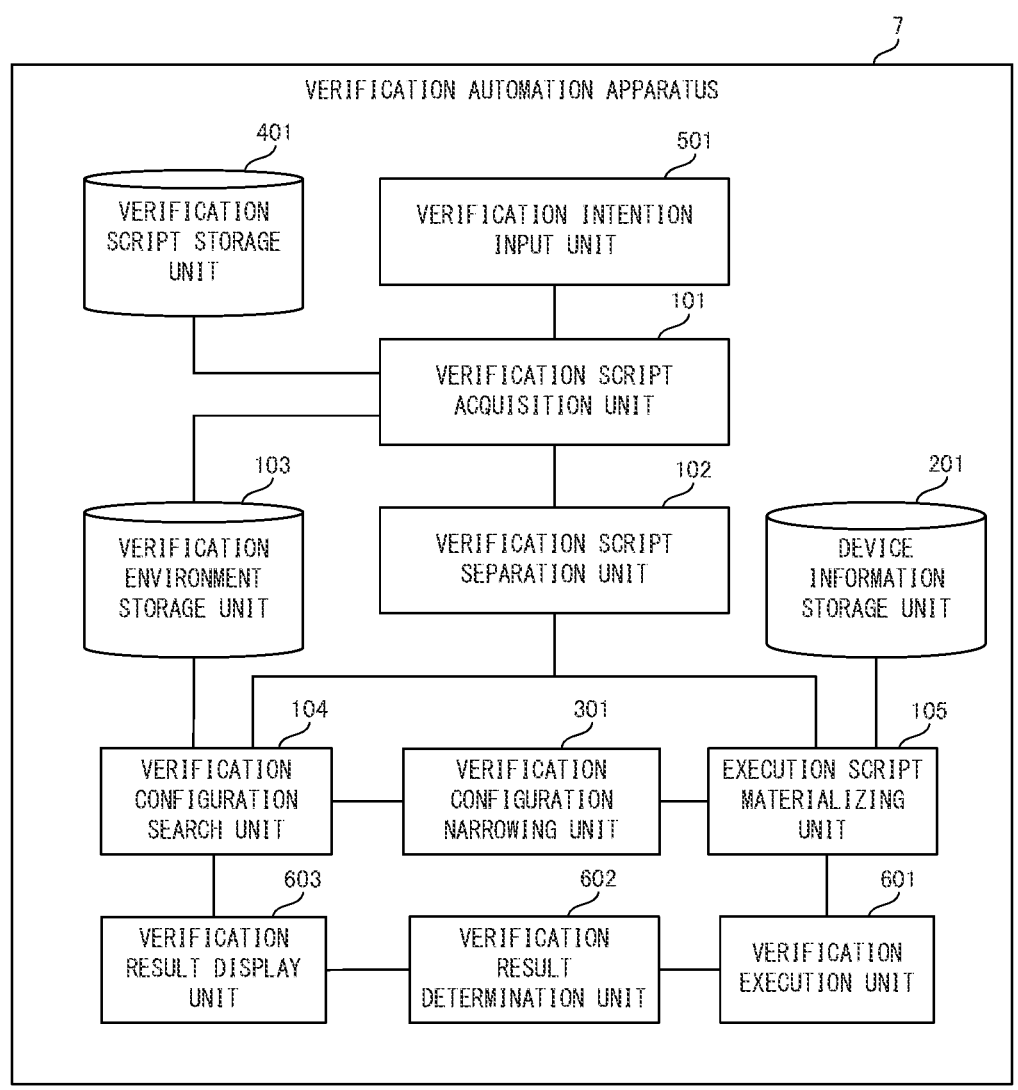
FIG. 22 is a block diagram showing a configuration of a verification automation apparatus according to a seventh example embodiment of the present invention.

As shown in FIG. 22, a verification automation apparatus 7 according to the seventh example embodiment includes the device information storage unit 201, the verification configuration narrowing unit 301, the verification script storage unit 401, the verification intention input unit 501, the verification execution unit 601, the verification result determination unit 602, and the verification result display unit 603 in addition to the components included in the verification automation apparatus 1 according to the first example embodiment shown in FIG. 2.

That is to say, the verification automation apparatus 7 according to the seventh example embodiment is formed by adding the constituent elements of the second, third, fifth, and sixth example embodiments to the verification automation apparatus 1 according to the first example embodiment. Note that, in FIG. 22, the same constituent elements as the constituent elements shown in the first, second, third, fifth, and sixth example embodiments are given the same reference numerals as those in the figures corresponding thereto, and the details of such constituent elements are omitted.

However, the seventh example embodiment is different from the above-described example embodiments, and the verification automation apparatus 7 provides a user interface on the screen of the terminal device of the user. FIG. 23 is a diagram showing an example of the user interface provided in the seventh example embodiment of the present invention.

Figure 23:
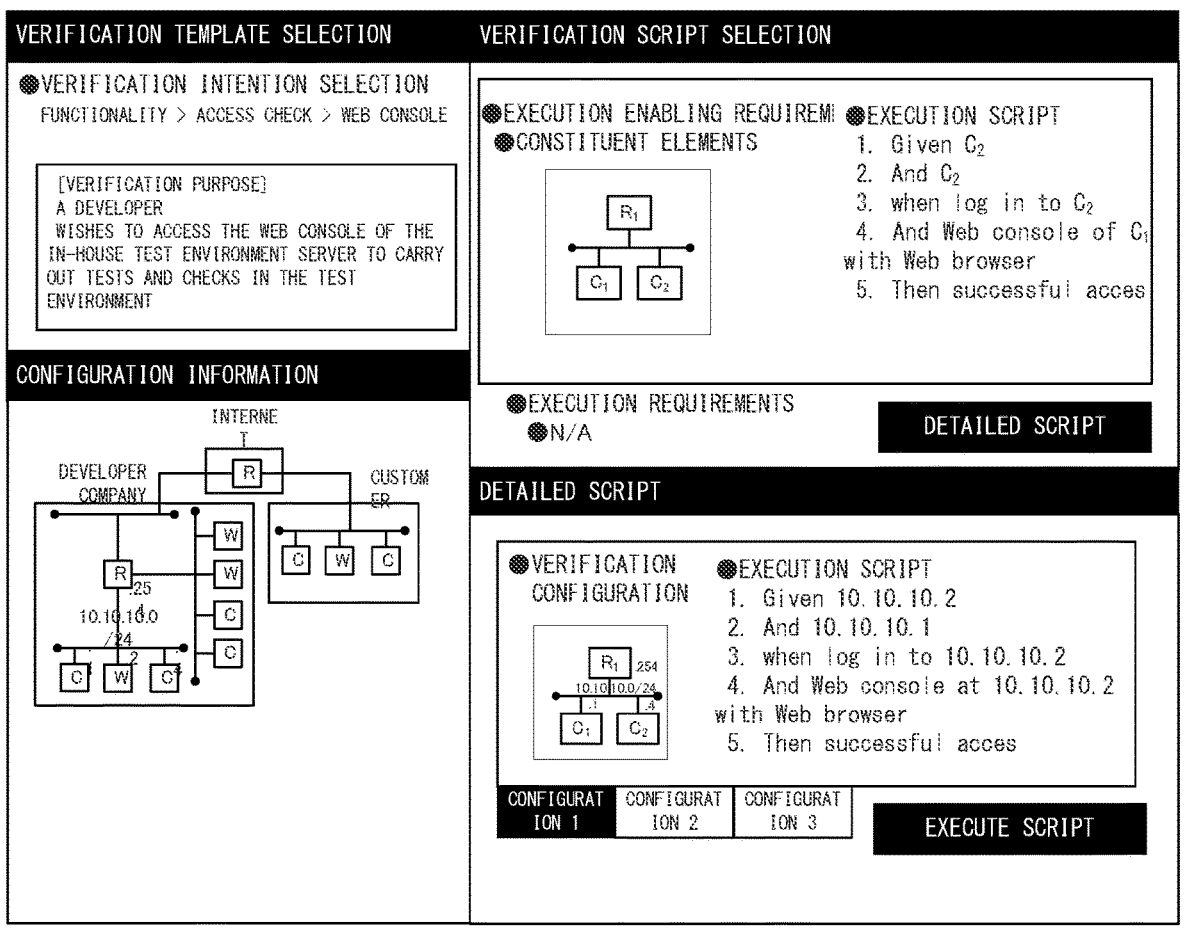
FIG. 23 is a diagram showing an example of a user interface provided in the seventh example embodiment of the present invention.

As shown in FIG. 23, the user interface displays a verification template selection screen, a verification script selection screen, a configuration information screen, and a detailed script screen. Note that, in the seventh example embodiment, the user interface is not limited to the example shown in FIG. 23.

The verification template selection screen is provided by the verification script acquisition unit 101. The verification script acquisition unit 101 displays a verification intention input from the verification intention input unit 501, and a verification purpose of the verification script selected in correspondence thereto, on the verification template selection screen.

The configuration information screen is provided by the verification configuration search unit 104. The verification configuration search unit 104 displays the environment information regarding the system to be verified, acquired from the verification environment storage unit 103, on the configuration information screen.

The verification script selection screen is provided by the verification script separation unit 102. The verification script separation unit 102 separates the verification script acquired by the verification script acquisition unit 101 into the execution enabling requirements and the execution script, and displays them on the verification script selection screen.

The detailed script screen is provided by the execution script materializing unit 105. The execution script materializing unit 105 materializes an execution script using the configuration to which configurations are narrowed down by the verification configuration narrowing unit 301, and displays the materialized execution scripts on the detailed script screen. Also, on the detailed script screen, each materialized execution script is displayed on the tab corresponding thereto.

[Apparatus Operations]

Next, operations of the verification automation apparatus 7 according to the seventh example embodiment will be described with reference to FIG. 24. FIG. 24 is a flowchart showing operations of the verification automation apparatus according to the seventh example embodiment of the present invention. In the following description, FIGS. 22 and 23 are referenced when necessary. Also, in the seventh example embodiment, a verification automation method is carried out by operating the verification automation apparatus 7. Therefore, the following description of operations of the verification automation apparatus 7 substitutes for a description of the verification automation method in the seventh example embodiment.

Figure 24:
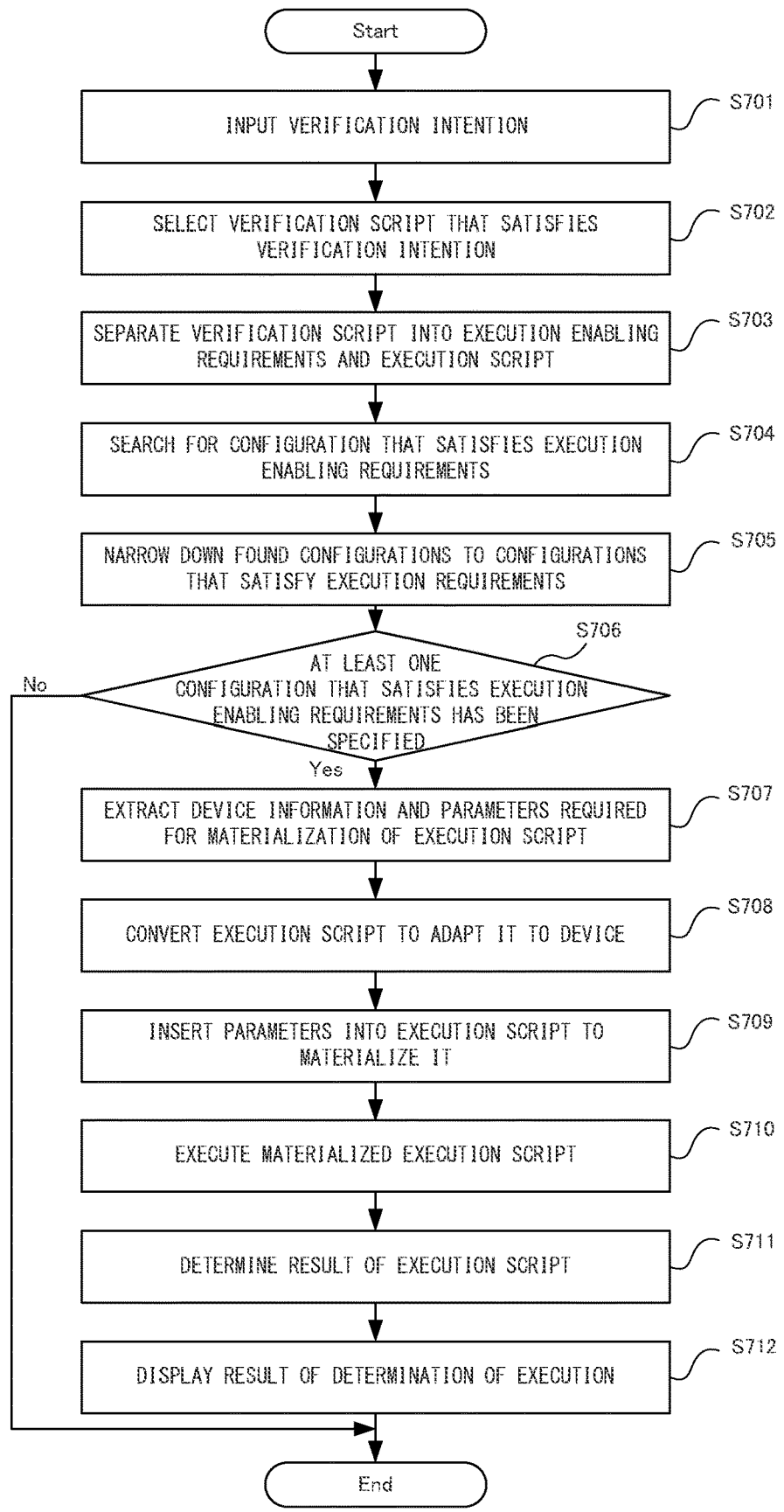
FIG. 24 is a flowchart showing operations of the verification automation apparatus according to the seventh example embodiment of the present invention.

As shown in FIG. 24, first, the verification intention input unit 501 inputs a verification intention for the system to be verified, to the verification script acquisition unit 101, according to an instruction from the user (step S701). Step S701 is the same step as the step S501 shown in FIG. 19.

Next, the verification script acquisition unit 101 searches the verification script storage unit 401 for all the verification scripts corresponding to the verification intention input in step S501, and selects the verification scripts that have been found (step S702). Step S701 is the same step as the step S502 shown in FIG. 19.

In step S702, the verification script acquisition unit 101 displays a verification intention input from the verification intention input unit 501, and a verification purpose of the verification script selected in correspondence thereto, on the verification template selection screen.

Next, the verification script separation unit 102 separates each verification script selected in step S702 into execution enabling requirements and an execution script (step S703). Step S703 is the same step as the step S101 shown in FIG. 6.

In step S703, the verification script separation unit 102 separates the verification script into the execution enabling requirements and the execution script, and displays them on the verification script selection screen.

Next, the verification configuration search unit 104 searches for a system configuration that satisfies the execution enabling requirements (step S704). Step S704 is the same step as the step S103 shown in FIG. 6.

In step S704, the verification configuration search unit 104 displays the environment information regarding the system to be verified, acquired from the verification environment storage unit 103, on the configuration information screen. Upon the user pressing a detailed script button on the verification script selection screen, the following processing is performed.

Next, the verification configuration narrowing unit 301 determines whether or not the configurations found in step S704 satisfy the execution requirements for the execution script, and narrows down the configurations to configurations that satisfy the execution requirements (step S705). Step S705 is the same step as the step S304 shown in FIG. 13.

Next, the verification configuration search unit 104 determines whether or not at least one configuration that satisfies the execution enabling requirements has been specified after step S705 has been executed (step S706). Step S706 is the same step as the step S104 shown in FIG. 6.

If it is determined in step S706 that it has been impossible to specify at least one configuration, step S712 described below is performed.

On the other hand, if it determined in step S706 that at least one configuration has been specified, the verification configuration search unit 104 extracts, for every specified configuration, the parameters that represent the configuration, and device information corresponding thereto (step S707). Step S707 is the same step as the step S205 shown in FIG. 10.

Next, the execution script materializing unit 105 converts the parameters of the execution script to adapt them to each device, with reference to the device information extracted in step S707 (step S708). Step S708 is the same step as the step S206 shown in FIG. 10.

Next, the execution script materializing unit 105 inserts the parameters extracted in step S707 into the parameters of each execution script, to materialize the execution script (step S709). Step S709 is the same step as the step S106 shown in FIG. 6. As a result, a set of execution scripts that are executable in the verification environment is generated.

After executing step S709, the execution script materializing unit 105 displays the detailed script screen. In this state, upon the user selecting a verification script that is to be executed and pressing the script execution button (see FIG. 23), the following processing is started for the selected verification script. In this case, the execution script materializing unit 105 outputs the verification script including the materialized execution scripts to the verification execution unit 601.

Next, the verification execution unit 601 receives the verification script including the execution scripts materialized in step S709, and executes the execution scripts included in the verification script (step S710). Step S710 is the same step as the step S607 shown in FIG. 21.

Next, the verification result determination unit 602 performs determination on the result of the execution in step S710 (step S711). Step S711 is the same step as the step S608 shown in FIG. 21.

Next, the verification result display unit 603 displays the result of determination in step S711 on the screen of a terminal device or the like of the user, as the result of verification (step S712). If it is determined in step S706 that it has been impossible to specify at least one configuration, the verification result display unit 603, in step S712, displays the result of verification "Failed" regarding the verification script for which the verification configuration search unit 104 could not specify a configuration that satisfies the execution enabling requirements. Step S712 is the same as the step S609 shown in FIG. 21.

Description of Effects

As described above, in the seventh example embodiment, a verification script is searched for according to the user's verification intention, and an execution script is materialized using verification configuration information found based on the execution enabling requirements in the verification script and information regarding each device included in the verification configuration information. Furthermore, the materialized execution script is automatically executed, and the result thereof is displayed.

[Program]

A program according to the seventh example embodiment need only be a program that enables a computer to execute the steps S701 to S712 shown in FIG. 24. It is possible to realize the verification automation apparatus 7 and the verification automation method according to the seventh example embodiment by installing this program to a computer and executing the program. In this case, a processor of the computer functions as the verification script acquisition unit 101, the verification script separation unit 102, the verification configuration search unit 104, the execution script materializing unit 105, the verification configuration narrowing unit 301, the verification intention input unit 501, the verification execution unit 601, the verification result determination unit 602, and the verification result display unit 603, and performs processing. The verification environment storage unit 103, the device information storage unit 201, and the verification script storage unit 401 are realized by storing environment information in a storage device such as a hard disk provided in the computer.

The program according to the seventh example embodiment may also be executed by a computer system built from a plurality of computers. In this case, for example, each computer may function as the verification script acquisition unit 101, the verification script separation unit 102, the verification configuration search unit 104, the execution script materializing unit 105, the verification configuration narrowing unit 301, the verification intention input unit 501, the verification execution unit 601, the verification result determination unit 602, or the verification result display unit 603. Also, the verification environment storage unit 103, the device information storage unit 201, and the verification script storage unit 401 may be built on a computer other than the computer that executes the program according to the seventh example embodiment.

(Physical Configuration)

Figure 25:
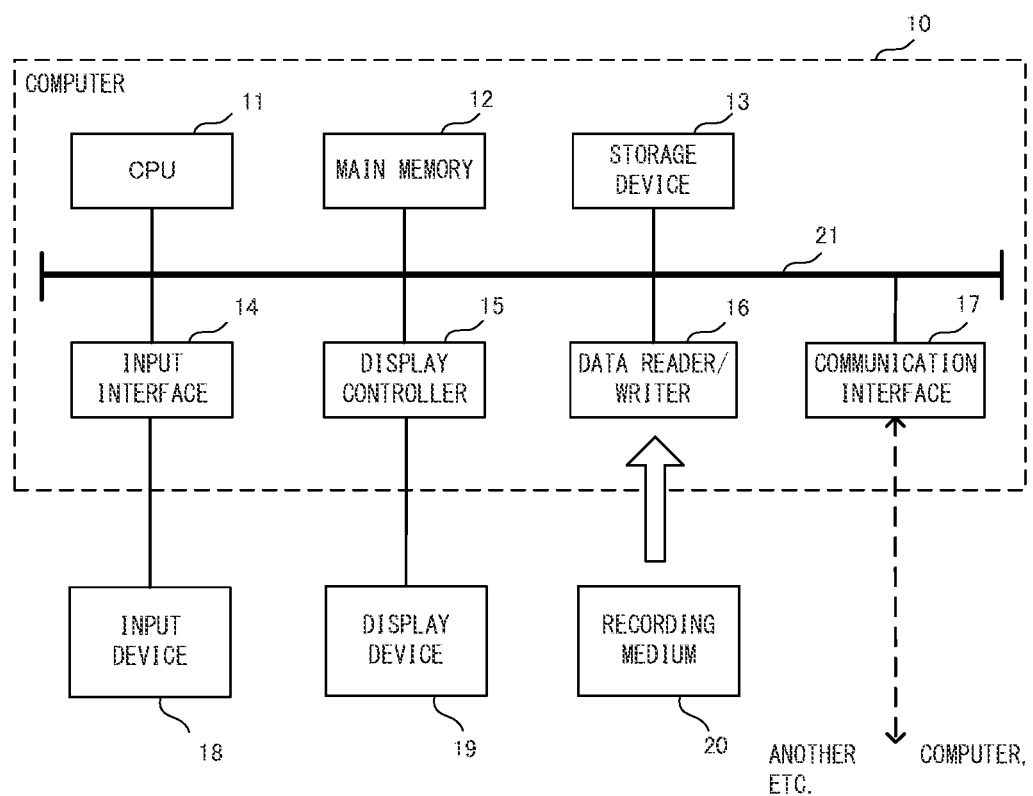
FIG. 25 is a block diagram showing an example of a computer that realizes a verification automation apparatus according to the first to seventh example embodiment of the present invention.

Hereinafter, a computer that realizes verification automation according to the first to seventh example embodiments by executing the program according to any one of the first to seventh example embodiments will be described with reference to FIG. 25. FIG. 25 is a block diagram showing an example of a computer that realizes a verification automation apparatus according to the first to seventh example embodiment of the present invention.

As shown in FIG. 25, a computer 10 includes a CPU 11, a main memory 12, a storage device 13, an input interface 14, a display controller 15, a data reader/writer 16, and a communication interface 17. These units are connected so as to be able to perform data communication with each other via a bus 21. Note that the computer 10 may include a GPU (Graphics Processing Unit) or an FPGA (Field-Programmable Gate Array) in addition to the CPU 11 or instead of the CPU 11.

The CPU 11 loads the program (codes) according to the example embodiments stored in the storage device 13 to the main memory 12, and execute the codes in a predetermined order to perform various kinds of computations. The main memory 12 is typically a volatile storage device such as a DRAM (Dynamic Random Access Memory). The program according to the example embodiments is provided in the state of being stored in a computer-readable recording medium 120. Note that the program according to the example embodiments may be distributed on the internet connected via a communication interface 117.

Specific examples of the storage device 13 include a hard disk drive, and a semiconductor storage device such as a flash memory. The input interface 14 mediates data transmission between the CPU 11 and input devices 18 such as a keyboard and a mouse. The display controller 15 is connected to a display device 19, and controls display on the display device 19.

The data reader/writer 16 mediates data transmission between the CPU 11 and a recording medium 20, reads the program from the recording medium 20, and writes the result of processing in the computer 10 to the recording medium 20. The communication interface 17 mediates data transmission between the CPU 11 and another computer.

Specific examples of the recording medium 20 include general-purpose semiconductor storage devices such as a CF (Compact Flash (registered trademark)) and an SD (Secure Digital), magnetic recording media such as a Flexible Disk, and optical recording media such as a CD-ROM (Compact Disk Read Only Memory).

Note that the verification automation apparatus according to the first to seventh embodiments can be realized using hardware corresponding to the respective units thereof instead of a computer to which a program is installed. Furthermore, part of the verification automation apparatus according to the first to seventh example embodiments may be realized using a program, and the rest may be realized using hardware.

One or more or all of the above-described example embodiments can be represented by the following (Supplementary note 1) to (Supplementary note 24), but are not limited to the following description.

(Supplementary Note 1)

An apparatus for adapting a verification script to a system that is to be verified, including:

a verification script acquisition unit that acquires the verification script including an execution script for verification work and execution enabling requirements for executing the execution script;

a verification configuration search unit that searches for, using environment information regarding the system to be verified and the execution enabling requirements, configurations which enable to execute the execution script in the system to be verified; and an execution script materializing unit that materializes the execution script based on the configuration that has been found through the search, so as to be executable in the system to be verified.

(Supplementary Note 2)

The verification automation apparatus according to Supplementary note 1, further including:

a verification script separation unit that separates the verification script acquired by the verification script acquisition unit into the execution script and the execution enabling requirements.

(Supplementary Note 3)

The verification automation apparatus according to Supplementary note 1 or 2, wherein the environment information includes information regarding a device and a network included in the system to be verified, and defines the device and the network using parameters, the execution enabling requirements include information regarding a system configuration for which the execution script is executable, the verification configuration search unit searches the environment information based on the execution enabling requirements to specify the configuration represented by the parameters, and the execution script materializing unit materializes the execution script by modifying parameters included in the execution script, using the parameters that represent the configuration.

(Supplementary Note 4)

The verification automation apparatus according to any one of Supplementary notes 1 to 3, wherein the execution script materializing unit adapts the execution script to the device, based on a correspondence relationship between specific operations in the system to be verified and operational instructions that are unique to devices included in the system to be verified, and thereafter materializes the execution script.

(Supplementary Note 5)

The verification automation apparatus according to any one of Supplementary notes 1 to 4, wherein, in the verification script, the execution enabling requirements include an execution requirement that is required for devices included in the system to run the execution script, the verification automation apparatus further includes a verification configuration narrowing unit that specifies a configuration that satisfies the execution requirement from among the configurations that have been found through the search, and the execution script materializing unit materializes the execution script based on the configuration specified by the verification configuration narrowing unit, so as to be executable in the system to be verified.

(Supplementary Note 6)

The verification automation apparatus according to any one of Supplementary notes 1 to 5, wherein a plurality of verification scripts have been prepared in advance, and the verification script acquisition unit selects a specific verification script from among the plurality of verification scripts, and acquires the selected verification script.

(Supplementary Note 7)

The verification automation apparatus according to Supplementary note 6, wherein each verification script of the plurality of verification scripts includes an intention regarding creation of the verification script, the verification automation apparatus further includes a verification intention input unit that inputs an intention regarding verification of the system to be verified, to the verification script acquisition unit, and the verification script acquisition unit selects a verification script corresponding to the input intention from among the plurality of verification scripts.

(Supplementary Note 8)

The verification automation apparatus according to any one of Supplementary notes 1 to 7, further including:

a verification execution unit that executes the execution script that has been materialized;

a verification result determination unit that performs determination on a result of execution of the execution script; and a verification result display unit that displays the result of determination as a result of verification.

(Supplementary Note 9)

A verification automation method for adapting a verification script to a system that is to be verified, including:

(a) a step of acquiring the verification script including an execution script for verification work and execution enabling requirements for executing the execution script;

(b) a step of, using environment information regarding the system to be verified and the execution enabling requirements, searching for configurations which enable to execute the execution script in the system to be verified; and (c) a step of materializing the execution script based on the configuration that has been found through the search, so as to be executable in the system to be verified.

(Supplementary Note 10)

The verification automation method according to Supplementary note 9, further including:

(d) a step of separating the verification script acquired in the (a) step into the execution script and the execution enabling requirements.

(Supplementary Note 11)

The verification automation method according to Supplementary note 9 or 10, wherein the environment information includes information regarding a device and a network included in the system to be verified, and defines the device and the network using parameters, the execution enabling requirements include information regarding a system configuration for which the execution script is executable, in the (b) step, the environment information is searched based on the execution enabling requirements and the configuration represented by the parameters is specified, and in the (c) step, the execution script is materialized by modifying parameters included in the execution script, using the parameters that represent the configuration.

(Supplementary Note 12)

The verification automation method according to any one of Supplementary notes 9 to 11, wherein, in the (c) step, the execution script is adapted to the device, based on a correspondence relationship between specific operations in the system to be verified and operational instructions that are unique to devices included in the system to be verified, and thereafter the execution script is materialized.

(Supplementary Note 13)

The verification automation method according to any one of Supplementary notes 9 to 12, wherein, in the verification script, the execution enabling requirements include an execution requirement that is required for devices included in the system to run the execution script, the verification automation method further includes:

(e) a step of specifying a configuration that satisfies the execution requirement from among the configurations that have been found through the search in the (b) step, and in the (c) step, the execution script is materialized based on the configuration specified in the (e) step, so as to be executable in the system to be verified.

(Supplementary Note 14)

The verification automation method according to any one of Supplementary notes 9 to 13, wherein a plurality of verification scripts have been prepared in advance, and in the (a) step, a specific verification script is selected from among the plurality of verification scripts, and the selected verification script is acquired.

(Supplementary Note 15)

The verification automation method according to Supplementary note 14, wherein each verification script of the plurality of verification scripts includes an intention regarding creation of the verification script, the verification automation method further includes:

(f) a step of inputting an intention regarding verification of the system to be verified, and the (a) step further includes a step of selecting a verification script corresponding to the input intention from among the plurality of verification scripts.

(Supplementary Note 16)

The verification automation method according to any one of Supplementary notes 9 to 15, further including:

(g) a step of executing the execution script that has been materialized;

(h) a step of performing determination on a result of execution of the execution script; and (i) a step of displaying the result of determination as a result of verification.

(Supplementary Note 17)

A computer-readable recording medium that includes a program recorded thereon, the program being for adapting a verification script to a system that is to be verified and including instructions for causing a computer to carry out:

(a) a step of acquiring the verification script including an execution script for verification work and execution enabling requirements for executing the execution script;

(b) a step of, using environment information regarding the system to be verified and the execution enabling requirements, searching for configurations which enable to execute the execution script in the system to be verified; and (c) a step of materializing the execution script based on the configuration that has been found through the search, so as to be executable in the system to be verified.

(Supplementary Note 18)

The computer-readable recording medium according to Supplementary note 17, wherein the program further includes an instruction for causing a computer to carry out:

(d) a step of separating the verification script acquired in the (a) step into the execution script and the execution enabling requirements.

(Supplementary Note 19)

The computer-readable recording medium according to Supplementary note 17 or 18, wherein the environment information includes information regarding a device and a network included in the system to be verified, and defines the device and the network using parameters, the execution enabling requirements include information regarding a system configuration for which the execution script is executable, in the (b) step, the environment information is searched based on the execution enabling requirements and the configuration represented by the parameters is specified, and in the (c) step, the execution script is materialized by modifying parameters included in the execution script, using the parameters that represent the configuration.

(Supplementary Note 20)

The computer-readable recording medium according to any one of Supplementary notes 17 to 19, wherein, in the (c) step, the execution script is adapted to the device, based on a correspondence relationship between specific operations in the system to be verified and operational instructions that are unique to devices included in the system to be verified, and thereafter the execution script is materialized.

(Supplementary Note 21)

The computer-readable recording medium according to any one of Supplementary notes 17 to 20, wherein, in the verification script, the execution enabling requirements include an execution requirement that is required for devices included in the system to run the execution script, the program further includes an instruction for causing the computer to carry out:

(e) a step of specifying a configuration that satisfies the execution requirement from among the configurations that have been found through the search in the (b) step, and in the (c) step, the execution script is materialized based on the configuration specified in the (e) step, so as to be executable in the system to be verified.

(Supplementary Note 22)

The computer-readable recording medium according to any one of Supplementary notes 17 to 21, wherein a plurality of verification scripts have been prepared in advance, and in the (a) step, a specific verification script is selected from among the plurality of verification scripts, and the selected verification script is acquired.

(Supplementary Note 23)

The computer-readable recording medium according to Supplementary note 22, wherein each verification script of the plurality of verification scripts includes an intention regarding creation of the verification script, the program further includes an instruction to cause the computer to carry out:

(f) a step of inputting an intention regarding verification of the system to be verified, and in the (a) step, the computer is caused to carry out a step of selecting a verification script corresponding to the input intention from among the plurality of verification scripts.

(Supplementary Note 24)

The computer-readable recording medium according to any one of Supplementary notes 17 to 23, wherein the program further includes instructions for causing the computer to carry out:

(g) a step of executing the execution script that has been materialized;

(h) a step of performing determination on a result of execution of the execution script; and (i) a step of displaying the result of determination as a result of verification.

While the invention has been described with reference to the example embodiment, the invention is not limited to the example embodiments described above. Various modifications that can be understood by a person skilled in the art may be applied to the configuration and the details of the present invention within the scope of the present invention.

This application is based upon and claims the benefit of priority from Japanese patent application No. 2018-127878 filed on Jul. 4, 2018, the disclosure of which is incorporated herein in its entirety by reference.

INDUSTRIAL APPLICABILITY

As described above, the present invention makes it possible to reuse a verification script without manually modifying the internal parameters of the verification script. The present invention is useful when a system designer wishes to run a system operation verification program created for another system, on their own system.

REFERENCE SIGNS LIST

1 Verification automation apparatus (First example embodiment)
2 Verification automation apparatus (Second example embodiment)
3 Verification automation apparatus (Third example embodiment)
4 Verification automation apparatus (Fourth example embodiment)
5 Verification automation apparatus (Fifth example embodiment)
6 Verification automation apparatus (Sixth example embodiment)
7 Verification automation apparatus (Seventh example embodiment)
10 Computer
11 CPU
12 Main memory
13 Storage device
14 Input interface
15 Display controller
16 Data reader/writer
17 Communication interface
18 Input device
19 Display device
20 Recording medium
21 Bus
101 Verification script acquisition unit
102 Verification script separation unit
103 Verification environment storage unit
104 Verification configuration search unit
105 Execution script materializing unit
110 Execution enabling requirement acquisition unit
111 Execution script acquisition unit
201 Device information storage unit
301 Verification configuration narrowing unit
401 Verification script storage unit
402 Verification script selection unit
501 Verification intention input unit
502 Verification script selection unit
601 Verification execution unit
602 Verification result determination unit
603 Verification result display unit

What is claimed is:

1. A verification automation apparatus for adapting a verification script to a system that is to be verified, comprising:
  a memory storing one or more instructions; and
  a processor configured to execute the one or more instructions to implement:
    a verification script acquisition unit configured to acquire the verification script including an execution script for verification work and execution enabling requirements for executing the execution script;
    a verification configuration search unit configured to search for, using environment information regarding the system to be verified and the execution enabling requirements, configurations which enable to execute the execution script in the system to be verified; and
    an execution script materializing unit configured to materialize the execution script based on the configuration that has been found through the search, so as to be executable in the system to be verified,
  wherein the environment information includes information regarding a device and a network included in the system to be verified, and defines the device and the network using parameters,
  the execution enabling requirements include information regarding a system configuration for which the execution script is executable,
    the verification configuration search unit searches the environment information based on the execution enabling requirements to specify the configuration represented by the parameters, and
    the execution script materializing unit materializes the execution script by modifying parameters included in the execution script, using the parameters that represent the configuration.

2. The verification automation apparatus according to claim 1, wherein the processor is further configured to execute the one or more instructions to implement:
  a verification script separation unit configured to separate the verification script acquired by the verification script acquisition unit into the execution script and the execution enabling requirements.

3. The verification automation apparatus according to claim 1,
  wherein the execution script materializing unit adapts the execution script to the device, based on a correspondence relationship between specific operations in the system to be verified and operational instructions that are unique to devices included in the system to be verified, and thereafter materializes the execution script.

4. The verification automation apparatus according to claim 1,
  wherein, in the verification script, the execution enabling requirements include an execution requirement that is required for devices included in the system to run the execution script,
  wherein the processor is further configured to execute the one or more instructions to implement a verification configuration narrowing unit that-configured to specify a configuration that satisfies the execution requirement from among the configurations that have been found through the search, and wherein the execution script materializing unit materializes the execution script based on the configuration specified by the verification configuration narrowing unit, so as to be executable in the system to be verified.

5. The verification automation apparatus according to claim 1,
wherein a plurality of verification scripts have been prepared in advance, and
the verification script acquisition unit selects a specific verification script from among the plurality of verification scripts, and acquires the selected verification script.

6. The verification automation apparatus according to claim 5,
wherein each verification script of the plurality of verification scripts includes an intention regarding creation of the verification script,
wherein the processor is further configured to execute the one or more instructions to implement:
a verification intention input unit configured to input an intention regarding verification of the system to be verified, to the verification script acquisition unit, and
the verification script acquisition unit selects a verification script corresponding to the input intention from among the plurality of verification scripts.

7. The verification automation apparatus according to claim 1, wherein the processor is further configured to execute the one or more instructions to implement:
a verification execution unit for executing the execution script that has been materialized;
a verification result determination unit for performing determination on a result of execution of the execution script; and
a verification result display unit for displaying the result of determination as a result of verification.

8. A verification automation method for adapting a verification script to a system that is to be verified, comprising:
acquiring the verification script including an execution script for verification work and execution enabling requirements for executing the execution script;
using environment information regarding the system to be verified and the execution enabling requirements, searching for configurations which enable to execute the execution script in the system to be verified; and
materializing the execution script based on the configuration that has been found through the search, so as to be executable in the system to be verified,
wherein the environment information includes information regarding a device and a network included in the system to be verified, and defines the device and the network using parameters,
the execution enabling requirements include information regarding a system configuration for which the execution script is executable,
the environment information is searched based on the execution enabling requirements to specify the configuration represented by the parameters, and
the execution script is materialized by modifying parameters included in the execution script, using the parameters that represent the configuration.

9. A non-transitory computer-readable recording medium that includes a program recorded thereon, the program being for adapting a verification script to a system that is to be verified and including instructions for causing a computer to carry out:
acquiring the verification script including an execution script for verification work and execution enabling requirements for executing the execution script;
using environment information regarding the system to be verified and the execution enabling requirements, searching for configurations which enable to execute the execution script in the system to be verified; and
materializing the execution script based on the configuration that has been found through the search, so as to be executable in the system to be verified,
wherein the environment information includes information regarding a device and a network included in the system to be verified, and defines the device and the network using parameters,
the execution enabling requirements include information regarding a system configuration for which the execution script is executable,
the environment information is searched based on the execution enabling requirements to specify the configuration represented by the parameters, and
the execution script is materialized by modifying parameters included in the execution script, using the parameters that represent the configuration.

* * * * *